6/30/87 XR 4,677,674

United States Patent [19]

Snyder

[11] Patent Number: 4,677,674

[45] Date of Patent: Jun. 30, 1987

[54] APPARATUS AND METHOD FOR REESTABLISHING PREVIOUSLY ESTABLISHED SETTINGS ON THE CONTROLS OF AN AUDIO MIXER

[76] Inventor: Seth Snyder, 17630 NE. 8th Pl., North Miami Beach, Fla. 33162

[21] Appl. No.: 719,580

[22] Filed: Apr. 3, 1985

[51] Int. Cl.[4] .............................. H04B 3/00

[52] U.S. Cl. .............................. 381/58; 381/119; 324/77 B

[58] Field of Search .................. 381/58, 119, 102, 80, 381/81; 364/571; 84/115; 324/77 R, 77 B, 77 E, 77 D, 113

[56] References Cited

U.S. PATENT DOCUMENTS

| | | | |
|---|---|---|---|
| 3,883,703 | 5/1975 | Unger | 179/175.3 |
| 3,973,112 | 8/1976 | Sloane | 324/77 B |
| 4,118,666 | 10/1978 | Bernstein | 324/77 B |
| 4,186,282 | 1/1980 | Ellson | 179/175.3 |
| 4,301,536 | 11/1981 | Favin et al. | 371/22 |
| 4,307,340 | 12/1981 | Inami | 381/58 |
| 4,359,601 | 11/1982 | England | 381/58 |
| 4,479,240 | 10/1984 | McKinley, Jr. | 381/119 |
| 4,504,968 | 3/1985 | Kaneko | 381/58 |
| 4,536,887 | 8/1985 | Kaneda | 381/58 |
| 4,539,518 | 9/1985 | Kitayoshi | 324/77 B |

FOREIGN PATENT DOCUMENTS

| | | | |
|---|---|---|---|
| 2140248 | 11/1984 | United Kingdom | 381/119 |

OTHER PUBLICATIONS

R. Richards, et al., "An Experimental All-Digital Studio Mixing Desk," *J. Audio Eng. Soc.*, vol. 30, No. 3, 1982, Mar., pp. 117-126.

Article by Ken Pohlman in *Mix*, vol. 8, No. 5, May 1984, pp. 50-54.

Brochure by Sound Workshop for Diskmix—The Automation Storage/Editing System.

2 Brochures of Valley People, Inc. (merger of Allison Research & Valley Audio) re: Fadex.

Letters of Jun. 15, 1984 and Apr. 30, 1984 from George Massenburg Labs, also Oct. '82 and Dec. '84 Lit.

3 Brochures from Solid State Logic, concerning its SL6000E Series, the 4000E Series, and the 5000M Series.

Manual of MCI, Inc., for its JH-50/500 Console Automation System.

An undated brochure concerning the DBX 2252 True RMS-Level Detector.

Article from the Magazine Studio Sound and Broadcast Engineering, Dec. 1982, vol. 24, No. 12.

An undated brochure from DBX entitled "DEX 2150 Series Voltage Controlled Amplifiers".

1985 Brochure from Audio Kinetics concerning their Mix Master Computer Assisted Mixer.

Preliminary Information Sheet dated 12/1985 by Digital Creations Corp. re: Diskmix; their Storage/Editing System.

An undated Preliminary Data Sheet relating to a DBX 202 S Voltage Controlled Amplifier.

Article entitled "Applications of a Voltage-Controlled Amplifiers" presented at the 70th Convention, 10/30/81-11/2/81.

1985 Brochure of Mitsubishi Pro Audio Group Concerning Super Star Audio Mixer.

*Primary Examiner*—Gene Z. Rubinson

*Assistant Examiner*—L. C. Schroeder

*Attorney, Agent, or Firm*—Gary M. Jacobs

[57] ABSTRACT

An apparatus and a method for reestablishing previously established settings on the controls of an audio mixer having at least one input channel and at least one output channel. The method includes the steps of transmitting a first test signal through the at least one input channel; measuring and recording this first test signal during a first period of time at at least one output channel; transmitting a second test signal, substantially identical to the first test signal, through the at least one input channel during a second period of time; comparing this second test signal at the at least one output during the second period of time with the recorded first test signal; and altering the settings on the controls of the audio mixer in the event that the recorded first test signal is different from the second test signal of the at least one output. The apparatus includes means for transmitting the first and second test signals to the at least one input channel, means for recording the first test signal at the at least one output, means for displaying the recorded first test signal and the second test signal at the at least one output.

70 Claims, 7 Drawing Figures

APPARATUS AND METHOD FOR REESTABLISHING PREVIOUSLY ESTABLISHED SETTINGS ON THE CONTROLS OF AN AUDIO MIXER

BACKGROUND OF THE INVENTION

1. Field of the Invention

The invention relates to an apparatus and method for reestablishing previously established settings on the controls of an audio mixer or mixing console.

2. Description of Background Information

Audio mixers used in modern recording studios are provided with a number of different input channels for receiving audio signals. The function of the audio mixer is to vary the strength of the signals from the various input channels for receiving audio signals so as to produce a desired "mix" of sound as the final product. To this end, audio mixers include a plurality of mixing faders which determine the strength or amplitude of each signal from each input channel. In addition, audio mixers include channel mute controls for selectively turning each selected input channel on or off, as well as a panning controls for determining the left to right stereo positioning of the final output.

At each recording session, the audio engineer determines the desired "mix" for the music to be recorded by manipulating the settings on the various controls of the audio mixer. When the desired "mix" has been achieved, the recording session begins. It is common in recording live music, that more than one recording session will be required for recording the music of a particular group. It is also common that between these recording sessions, the recording studio will record other groups with the same audio mixer. As a result, the settings on the various controls of the audio mixer will be changed between the first and second recording session of a particular musical group. Thus, it is necessary for the audio engineer to manually record the settings on the controls of the audio mixer after the first session so that the settings can be reproduced during the second session. However, manually recording all of the settings on the audio console is time consuming and imprecise. Thus, there is a need for some type of automated system for reestablishing previously established settings on the controls of the audio mixer.

Several automation systems have previously been developed, but each of the systems have serious disadvantages. One system uses a voltage controlled amplifier as the gain element, instead of a potentiometer or pad which is normally used as the mixing fader. This type of system is manufactured by: Audio Machinery, Gelbart, MCI, INC., MCI Division of Sony Corporation, Sound Workshop, Valley People, Allison Research, and Solid State Logic of England. The mixing fader which this type of system automatically manipulates comprises a voltage divider. The physical position of the voltage divider determines the voltage output of the mixing fader. This output of the mixing fader is fed to the input of a voltage controlled amplifiers which comprises one component of the automated system. This DC control voltage is then digitized and recorded by the automated system. At a later time the digitized recording of the DC voltage gain can be read and the same DC control voltage can be generated by a digital to analog converter. The output of the digital to analog converter is connected to the control input of the voltage controlled amplifier which, therefore, in effect controls the gain or volume level out of that particular "mixing fader". As the recorded data changes over time, the DC control voltage changes and therefore the gain or volume level of the signal produced by the voltage control amplifier and the mixing fader changes.

A second type of automation system for reestablishing previously established settings on the controls of an audio mixer is manufactured by GML-George Massenburg Labs and by Rupert Neve of England. This type of automated system comprises a motorized mixing fader with a tachometer. The tachometer measures the physical position of the mixing fader. Also provided is a means for recording the position of the mixing fader by recording the setting on the tachometer at a particular time. At a later time the recording can be read and this information is fed to a motor which adjusts the position of the potentiometer of the mixing fader until it is in its previous position. As the recorded data changes the motor will make any adjustments necessary to change the position of mixing fader.

A third type of automated system, is manufactured by Solid State Logic of England, includes a rotary control comprising an additional gain or potentiometer on the same shaft as the mixing fader. This additional potentiometer comprises a voltage divider so as to provide on its wiper a voltage varying with the position of the control. This automatic mechanism also includes a means for digitizing and recording this voltage. At a later time this recording of the digitized voltage can be reproduced and compared with the current voltage from the same gang of the same potentiometer. The operator then manipulates this control of the mixing fader until the difference between the old setting and the current setting are 0.

All of these automated systems require a controllable gain device which comprises either a voltage controlled amplifier or a motorized mixing fader. Both of these types of devices are expensive and cumbersome. Furthermore, the automatic system comprising the rotary control requires additional hardware in the form of multi-ganged potentiometers, as well as a very large data acquisition or scanning system, and wiring which must be built in or installed for this system to operate.

Thus, there is a need for an automated system for reestablishing previously established settings on the controls of an audio mixer that is both inexpensive and not cumbersome to install.

SUMMARY OF THE INVENTION

It is an object of the present invention to provide an apparatus and method for reestablishing previously established settings on the controls of an audio mixer that is both inexpensive wand does not require any installation on an already existing mixing console or audio mixer.

In one embodiment, the invention is used with an audio mixer comprising at least one input channel and at least one output channel associated with the at least one input channel. The controls control the value of at least one parameter of signals transmitted from at least one input channel to at least one output channel. The method comprises the steps of: (a) transmitting a first test signal defined by at least one parameter through the at least one input channel during the first period of time; (b) and recording this first test signal at the at least one output channel during this first period of time.

In addition the method further comprises the step of: (c) transmitting a second test signal through the at least one input channel during a second period of time later than the first period of time. This second test signal is defined by at least one parameter which is substantially identical to the at least one parameter of the first signal. In addition, the method further comprises the step of: (d) comparing this second test signal at the at least one output channel during the second period of time with the recorded first test signal; and (e) altering the settings of the controls during the second period of time in the event that the value of the at least one parameter of the second test signal at the at least one output channel during the second period of time is different than the value of the at least one parameter of the recorded first test signal so that the value of the at least one parameter of the second test signal at the at least one output channel is substantially identical to the value of the at least one parameter of the recorded first test signal.

In addition, at least one parameter of the first test signal is measured and recorded before step (a) and the at least one parameter of the second test signal is measured before step (c) and after step (b). The first test signal recorded before step (a) is called the recorded base level first test signal. The value of the at least one parameter of the recorded base level test signal is compared to the value of the at least one parameter of the second test signal before this second test signal is transmitted to the at least one input channel and after the first test signal is recorded. Furthermore, the second test signal is altered before the second test signal is transmitted to the first input channel and after the first test signal is recorded, in the event that the value of at least one parameter of the recorded base level first test signal is different than the value of the at least one parameter of the second test signal so that the value of the at least one parameter of the second test signal before the second test signal is transmitted to the at least one input channel and after the first test signal is recorded is substantially identical to the value of the at least one parameter of the recorded base level first test signal. In this manner, the operator of the audio mixer can insure that the first test signal is substantially identical to the second test signal.

In addition, the method further comprises the step of disconnecting the at least one input channel from all sources of signals before transmitting the first test signal through the at least one input channel during the first period of time, and disconnecting the at least one input channel and all other input channels from all source of signals before transmitting the second test signal through the at least one input channel during the second period of time.

In addition, the method further comprises the steps of establishing a first setting for the controls of the audio mixer before the first test signal is transmitted to the at least one input channel; establishing a second setting for the controls of the audio mixer after the first test signal is recorded but before the second test signal is transmitted to the at least one input channel; reestablishing the first setting by performing step (e). In one embodiment the at least one parameter of the first and second test signals comprises the amplitude of the first and second test signals, respectively.

In another embodiment, the first test signal is defined by a plurality of parameters and the second test signal is also defined by a plurality of parameters substantially identical to the plurality of parameters defining the first test signal. In this embodiment, the controls of the audio mixer used in this embodiment comprise means for altering the values of the plurality of parameters of these first and second test signals as the first and second test signals are transmitted from the at least one input channel to the at least one output channel. In this embodiment, step (e) comprises the step of altering the settings of the controls during the second time period in the event that the value of at least one of the plurality of parameters of the second test signal at the at least one output channel is different from the value of a substantially identical parameter of the recorded first test signal so that the value of each of the plurality of parameters of the second test signal at the at least one output channel is substantially identical to the value of a substantially identical parameter of the recorded first test signal.

In still another embodiment, one of the plurality of parameters defining the first and second test signals comprises the amplitude of the first and second test signals, respectively, and another of the plurality of parameters defining the first and second test signals comprises the frequency of the first and second test signals, respectively. In addition, the controls comprise means for controlling the amplitude and the frequency response of the first and second test signals transmitted from the at least one input channel to the at least one associated output channel. In this embodiment, step (b) comprises the step of recording the amplitude of the first test signal at a plurality of frequencies at the at least one output channel during the first period of time. In addition, step (d) comprises the step of comparing the amplitude of the second test signal at the at least one output channel during the second period of time at a plurality of frequencies with the amplitude of the recorded first test signal at the same plurality of frequencies. Step (e) comprises the step of altering the settings of the amplitude and/or frequency control means in the event that the amplitude of the second test signal at the at least one output channel at at least one frequency is different from the amplitude of the recorded first test signal at that same frequency so that the amplitude of the second test signal at the at least one output channel at the plurality of frequencies is substantially identical to the amplitude of the recorded first test signal at this same plurality of frequencies.

In addition, in this embodiment, the step of establishing the first setting on the controls comprises establishing the first setting on the amplitude and the frequency controls means; the step of establishing the second setting on the controls comprises establishing the second setting on the amplitude and frequency controls; and the step of reestablishing the first setting on the controls comprises reestablishing the first setting on the amplitude and frequency control means.

In still another embodiment, one of the plurality of parameters defining the first and second test signals comprises the amplitude of the first and second test signals and another of the plurality of parameters define the first and second test signal comprises the frequency of the first and second test signals. In this embodiment, the controls comprise an equalizer for controlling the amplitude of the first and second test signals at a plurality of frequencies after the first and second test signals are transmitted to the input channel. The equalizer comprises an input and an output. In addition, the controls further comprise a mixing fader for controlling the amplitude of the first and second test signals at the output of the equalizer and at the output channel. The mixing fader also comprises an input and an output. In this embodiment, step (b) comprises the step of recording the amplitude of the first test signal at a plurality of frequencies at the output of the equalizer during the first period of time, and recording the amplitude of the first test signal at a plurality of frequencies at the output channel. In addition, step (d) comprises the step of comparing the amplitude of the second test signal at the output of the equalizer during the second period of time at a plurality of frequencies with the amplitude of the recorded first test signal at the same plurality of frequencies at the output of the equalizer, and comparing the amplitude of the second test signal at the output channel during the second period of time at a plurality of frequencies with the amplitude of the recorded first test signal at the same plurality of frequencies at the output channel.

In addition, in this embodiment step (e) comprises the steps of altering the setting of the equalizer in the event that the amplitude of the second test signal at the output of the equalizer at at least one frequency is different than the amplitude of the recorded first test signal at that same frequency at the output of the equalizer so that the amplitude of the second test signal at the equalizer output at the plurality of frequencies is substantially identical to the amplitude of the recorded first test signal at the plurality of frequencies at the equalizer outputs; and after this previous step, altering the setting of the mixing fader in the event that the amplitude of the second test signal at the at least one output channel at at least one frequency is different than the amplitude of the recorded first test signal at that same frequency at the output channel so that the amplitude of the second test signal at the at least one output channel is substantially identical to the amplitude of the recorded first test signal at the plurality of frequencies at the at least one output channel.

In addition, this method defined above further comprises steps of: transmitting the first test signal directly to the input of the mixing fader; recording the first test signal at the output of the mixing fader; transmitting second test signal directly to the input of the mixing fader; comparing the second test signal at the output of the mixing fader with the first test signal recorded at the output of the mixing fader; and altering the setting of the mixing fader during the second period of time in the event that the amplitude of the second test signal at the output of the mixing fader is different than the amplitude of the first test signal recorded at the output of the mixing fader so that the amplitude of the second test signal at the output of the mixing fader is substantially identical to the amplitude of the first test signal recorded at the output of the mixing fader.

In addition, the method further comprises the steps of: producing the first and second test signal with a spectrum analyzer sweep oscillator; measuring the first and second test signals at the at least one output channel and at the output of the equalizer and the mixing fader with a spectrum analyzer; and recording the first test signal with the memory of a personal computer.

In still another embodiment, the method is designed to be used with an audio mixer having a plurality of input channels. In this embodiment the method further comprises the steps of performing steps (a), (b), (c), (d), and (e), for each input channel. In addition, the method in this embodiment further comprises performing steps (a) and (b) during the first period of time for one input channel before performing steps (a) and (b) on each subsequent input channel; and performing steps (c), (d), and (e), during the second period of time for one input channel before performing steps (c), (d), and (e), on each subsequent input channel and after performing steps (a) and (b).

In addition, in still another embodiment, the method is designed to be used with an audio mixer comprising a plurality of output channels associated with at least one of the input channels. Each of the plurality output channels is identified by a different integers p, where p is greater than one and less than n, where n is equal to one more than the number of output channels. Thus, if there are five output channels, the output channels are designated by integers 1, 2, 3, 4, and 5. In this embodiment, step (a) comprises the step of transmitting the first test signal through the input channel associated with the n output channels. In addition, in this embodiment step (b) comprises to step of recording the first test signal at the plurality of output channels seriatim during the first period of time to produce p recorded first test signals. Each of the recorded first signals is identified by a different integer p so that p'th recorded first test signal represents the first test signal at the p'th output channel. Thus, when there are two input channels p equals 2. As a result, there is a first recorded test signal representing the first test signal recorded at the first output channel, and there is a second recorded first test signal representing the first test signal recorded at the second output channel. In addition, the second test signal transmitted through the at least one input channel is transmitted to each of the p output channels to produce p second test signal outputs. Each of the p second test output signals is also identified by integer p so that the p'th second test signal output represents the second test signal at the p'th output channel during the second period of time. Thus, when there are 3 output channels p equals 3. As a result, there is a first second test signal output representing the second test signal at the first output channel, a second second test signal output representing the second test signal at the second output, and a third second test signal output representing the second test signal at the third output. In this embodiment, step (d) comprises the steps of: (1) comparing the p'th recorded first test signal with p'th second test signal output when p equals 1; and repeating step (1) p times so that each time step (1) is repeated, p increases by 1. Thus, the recorded first test signal at the first output is compared with the second test signal output at the first output channel. After this step is completed the first test signal recorded at the second output channel is compared to the second test signal at the second output channel. This process is repeated until the first test signal recorded at the last output channel is compared to the second test signal output of the last output channel.

In addition, the method also is designed to be used on an audio mixer in which at least one of the plurality of output channels comprises an additional control for altering at least one parameter of the first and second test signals as the first and test signals are transmitted from the mixing fader to one of the plurality of output channels. In addition, the additional control comprises an input and an output. In this embodiment step (a) further comprises to step of transmitting the first test signal directly to the input of the additional control. Step (b) comprises to step of recording the first test signal at the output of the additional control during the first period of time. Step (c) comprises to step of transmitting a second test signal during the second time period directly to the input of the additional control. Step (d) comprises to step of comparing the second test signal at the output of the additional control with the first test signal recorded at the output of the additional control. Finally, step (e) further comprises step of altering the setting of the additional control in the event that the value of the at least one parameter controlled by the additional control of the second test signal at the additional control output is different than the value of the at least one parameter controlled by the additional control of the first test signal recorded at the output of the additional control so that the value of the at least one parameter controlled by the additional control of the second test signal at the additional control output is substantially identical to the at least one parameter controlled by the additional control of the first test signal recorded at the additional output. This additional control can comprise a panning control controlling the left to right stereo positioning of the output signal or a send or mix control which sends various inputs to an echo means for adding echo to the output signal or to headphones.

Still another embodiment, the at least one parameter referred to above in the various embodiments comprises the amplitude of the first and second test signals. In this embodiment, the method further comprises the step of measuring the value of this amplitude of the first and second test signals with a AC level meter.

In addition, still another embodiment, steps (a) and (c) comprise to step of transmitting the first and second test signal during the first and second period of times respectively, through at least one input channel by an oscillator.

In still another embodiment, the method of the present invention further comprises the step of displaying the at least one parameter of the recorded first test signal and displaying the at least one parameter of the second test signal at the at least output. The first and second test signals be displayed on a AC level meter. Alternatively, the at least one parameter of the recorded test signal can be displayed as a graphic representation on a cathode ray tube, as can the parameter of the second test signal at the at least one output.

The invention also comprises an apparatus for assisting the user of an audio mixer in reestablishing previously established settings on a controls of the audio mixer. The apparatus is designed to be used with an audio mixer comprising at least one input channel and at least one output channel associated with the at least one input channel. The controls of the audio mixer control the value of the at least one parameter of signals transmitted from the at least one input channel to the at least one output channel. The apparatus comprises: means for producing a first test signal defined by at least one parameter; means for transmitting the first test signal through at least one input channel during the first period of time; and means for recording the least one parameter of the first test signal at the at least one output channel during the first period of time.

In one embodiment, the producing means and the transmitting means may comprise a frequency generator and the recording means can comprise a personal computer. In still another embodiment, the producing means and transmitting means comprise a spectrum analyzer sweep oscillator for producing a first test signal defined by a plurality of amplitudes at a plurality of frequencies.

In still another embodiment, the apparatus further comprise: means for producing a second test signal defined by at least one parameter. This at least one parameter of the second test signal is substantially identical to the at least one parameter of the first test signal. In addition, the apparatus comprises means for transmitting the second test signal through the at least one input channel during a second period of time later than the first period of time. Also, the apparatus further comprises means for displaying the recorded at least one parameter of the first test signal and means for displaying at least one parameter of the second test signal at the at least one output.

In one embodiment, the means for producing and transmitting the first and second test signal comprises an oscillator, the recording means comprises a personal computer and the means for displaying the first and second test signals comprises a cathode ray tube. In still another embodiment, the means for displaying the first and second test signals can comprise a digital AC meter, or an analog AC meter. In still another embodiment, the means for producing and transmitting the first and second test signals can comprise a spectrum analyzer sweep oscillator.

Furthermore, the apparatus can further comprise means for measuring the at least one parameter of the first and second test signal at the at least one output. This measuring means can comprise a digital AC volt meter, a digital DC volt meter having a rectifier circuit, an analog to digital converter including a rectifier circuit and means to measure DC signals produced by the conversion of the analog signal to a digital signal, a multi-channel scanner having a rectifier circuit, a spectrum analyzer including a sweep oscillator in the audio range of 20–20,000 Hz, a fast fourier or a dual fourier transform signal analyzer in the audio range of 20 Hz–20,000 Hz, and/or a network analyzer in the audio range of 20 Hz–20,000 Hz.

The apparatus can further comprise means for comparing the at least one paratmeter of the recorded first test signal with the at least one parameter of the second test signal at the at least one output. In one embodiment, this comparing means can comprise a personal computer.

The apparatus further comprises means for measuring and recording the first and second test signals before the first and second test signals are transmitted to the at least one input channel, and means for altering the second test signal so that the second test signal is substantially identical to the first test signal.

In addition, the producing and transmitting means can comprise means for producing and transmitting a first test signal defined by a plurality of parameters. These plurality of parameters are controlled by the controls of the audio mixer. In addition, in this embodiment, the recording means comprises means for recording the plurality of parameters of the first test signal at the at least one output.

In addition, the means for producing and transmitting the first and second test signals comprises means for producing and transmitting first and second test signals defined by plurality of parameters. In addition, these plurality of parameters are controlled by the controls of the audio mixer. In this embodiment, the recording means comprises means for recording of plurality of parameters of the first test signal and the display means comprises means for displaying the plurality of parameters of the first and second test signals.

In this embodiment, the plurality of parameters can comprise at least first and second parameters. The controls of the audio mixer comprise means for controlling the value of the first parameter and means for controlling the value of the second parameter. The first and second parameter control means each comprise an input and an output. The first parameter control means is positioned between the at least one input channel and the second parameter control means so that the signals from the input channel are transmitted to the input of the first parameter control means, and the output of the first parameter control means is transmitted to the input of the second parameter control means. In addition, the second parameter control means is positioned between the first parameter control means and the output channel so that the output of the second parameter control means is transmitted to the at least one output channel of the audio mixer. In this embodiment, the means for transmitting the first and second test signals comprises means for transmitting first and second test signals to the input channel and directly to the input of the second parameter control means. In addition, the recording means comprises means for recording the first test signal at the output of the first parameter control means and at the output of the second control means. Also, the display means comprises means for displaying the first and second test signals when the first and second test signals are at the output of the first parameter control means and at the output of the second parameter control means.

In addition, the first parameter can comprise the amplitude of the first and second test signals and the second parameter can comprise the frequency of the first and second test signals. In this embodiment, the recording means comprises means for recording the amplitude of the first test signal at a plurality of frequencies and the display means comprises means for displaying the amplitude of the first and second test signals at a plurality of frequencies.

In addition, the audio mixer can comprise a plurality of input channels. In this embodiment, the transmitting means of the apparatus further comprises means for transmitting the first and second test signals through each of the plurality of input channels, the recording means comprises means for recording the first test signal transmitted to each of the plurality of input channels at the at least one input channel, and the display means comprises means for displaying the first and second test signals transmitted through each of the plurality of input channels.

Finally, the at least one of the input channels of the apparatus can comprise a plurality of output channels. In this embodiment, the recording means comprises means for recording the first test signal at each of the plurality of output channels, and the display means comprises means for displaying the first and second test signals as the first and second test signals are transmitted out of each of the plurality of output channels.

BRIEF DESCRIPTION OF THE DRAWINGS

Other objects, characteristics and advantages of the invention will be better understood by the detailed description that follows with reference to the attached drawings in which.

DETAILED DESCRIPTION OF PREFERRED EMBODIMENTS

Figure 1:
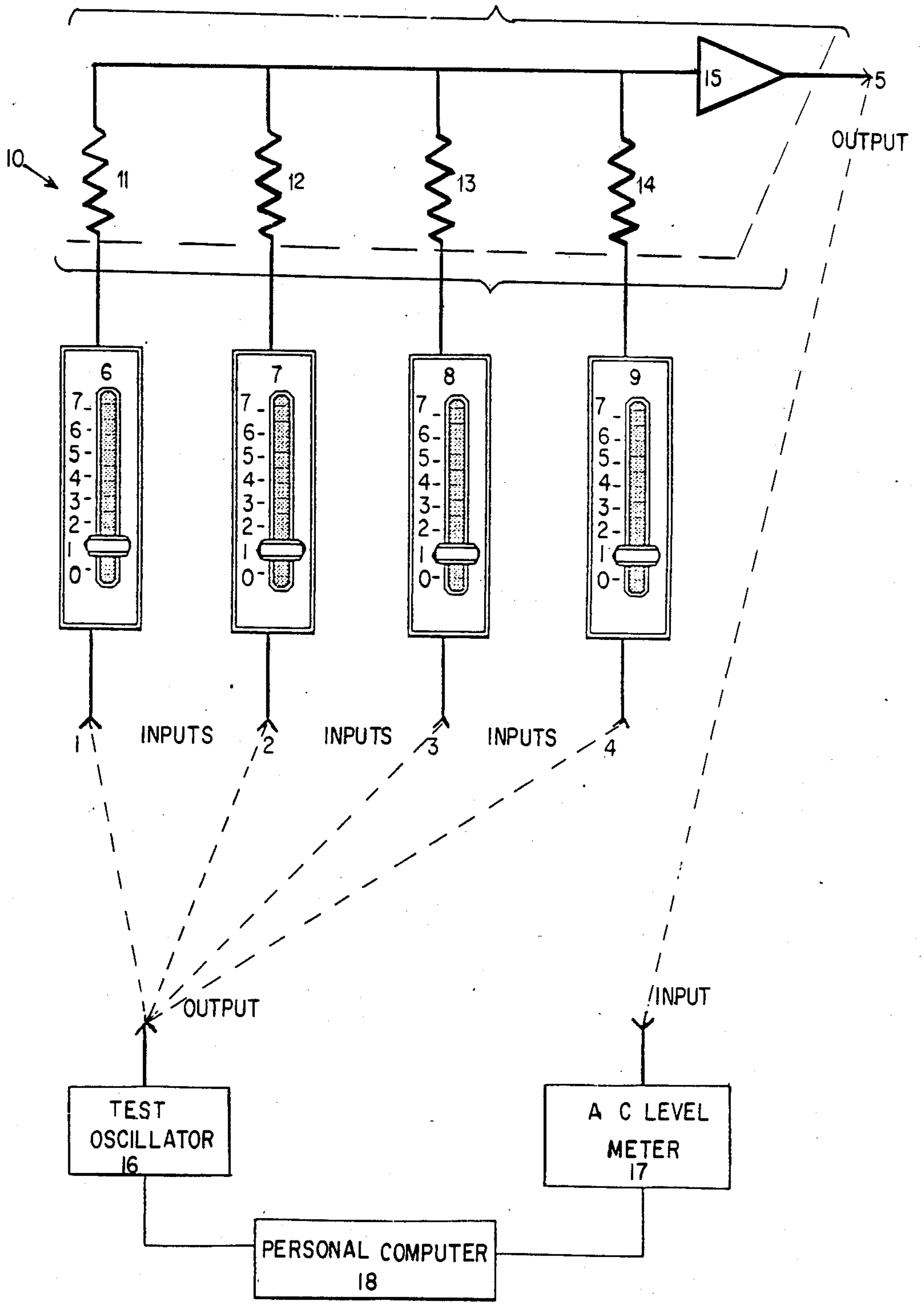
FIG. 1 illustrates a schematic signal flow diagram of a simple audio mixer having four input channels and one output channel, and an apparatus of the present invention for producing and transmitting a test signal to the four inputs of the audio mixer and for recording and measuring the output of the audio mixer.

The invention relates to an apparatus and a method for reestablishing previously established settings on the controls of an audio mixer. This is accomplished by producing a first test signal and transmitting this first test signal into a first input channel of the audio mixer during a first period of time in which the controls of the audio mixer are at an initial setting. This first test signal is then measured and recorded at the output of the audio mixer. If this first input channel of the audio mixer is associated with a plurality of output channels, for example ten output channels, then the first test signal is transmitted to this first input channel ten separate times and each time the first test signal is transmitted to the first input channel a different output channel is measured and recorded.

In one embodiment, the transfer function of the first test signal is recorded. The transfer function of a test signal is the amplitude of that test signal at a plurality of frequencies. Because the settings of the controls of the audio mixer can change the transfer function of a test signal, the recording of the transfer function gives the operator of the audio mixer a record of the settings of controls of the audio mixer at that particular time.

Later, during a second time period, when the operator desires to re-set the controls of the audio mixer because the settings of the control the audio mixer have been changed, a second test signal is produced and transmitted through the first input channel the output of the audio mixer is measured at the output channel (if there is only one output channel). The recorded first test signal is then compared with the second test signal at the output channel. More specifically, the differences between the transfer function of the first recorded test signal and the second test signal at the output of the audio mixer are compared. These two transfer functions can be displayed on a cathode ray tube or any other type of analog or digital or graphic display. If the two transfer functions are different, the operator can manipulate the controls of the audio mixer until the transfer function of the recorded first test signal and the second test signal are substantially equal to one another.

If the audio mixer has more than one output for each input channel, for example ten outputs numbered 1-10, then the second test signal is fed through this first input channel ten times and a second test signal from each different output channel is measured and displayed. The first test signal recorded at output channel 1 is displayed next to and compared to the second test signal at output channel 1. The controls of the mixer are then manipulated so that the transfer function of the second test signal at output channel 1 is substantially equal to the transfer function of the first test signal recorded at output channel 1. Similarly the first test signal recorded at output channel 2 is displayed next to and compared to the second test signal at output channel 2, and the controls of the audio mixer are then manipulated so that the transfer function of the second test signal at output channel 2 is substantially equal to the transfer function of the first test signal recorded at output channel 2. This process is repeated for channels 3-10.

This process is also repeated for all input channels and all signal paths through the mixer, a signal path being defined as a path through the mixer from one input channel to one output channel. Thus, if the audio mixer has only one input channel and ten output channels, there are ten signal paths through the mixer. On the other hand, if there are four input channels for the audio mixer, and if each input channel is associated with ten output channels, then there are forty signal paths through the mixer. When the second test signal through each path has been made equal to the first test signal recorded at the output of each corresponding path, the controls of the audio mixer has been completely re-set to their initial settings. Therefore, when identical audio signals are transmitted to the audio mixer during the first and second time periods, the balance heard during the second period of time at the output will be the same as that heard previously during the first period of time.

The equipment used to measure the transfer function of the first and second test signals can be any one of the following pieces of equipment, which are adapted to be controlled by a personal computer: a frequency generator or oscillator in the audio range of 20-20,000 Hz, for example model number SG 5010 made by TEKTRONICS; a digital AC voltmeter, for example model number 3468 B manufactured by HEWLETT PACKARD; a digital DC voltmeter having a precision rectifier circuit, for example model number 192 manufactured by KIETHLEY INSTRUMENTS; a digital DC voltmeter having a rectifier circuit, for example model number DM 5010 manufactured by TEKTRONICS; an analog two digital converter having a rectifier circuit, for example model number 50M10 manufactured by TEKTRONICS; a data acquisition system or multichannel-scanner with a rectifier circuit, for example model number TAURUS 05 manufactured by TAURUS COMPUTER; a spectrum analyzer comprising band pass filters in the audio range of 20-20,000 Hz, for example model number SS30ST manufactured by SANWA INSTRUMENTS, JAPAN; a spectrum analyzer comprising a sweep oscillator or filter in the audio range of 20-20,000 Hz, for example model number 3585A manufactured by HEWLETT PACKARD; a FFT signal analyzer in the audio range of 20-20,000 Hz (a fast fourier transform signal analyzer), for example model number VS 3310 manufactured by PANASONIC/-MATSUSHITA, JAPAN; a dual fourier transformer (DFT) signal analyzer in the audio range of 20-20,000 Hz, for example model number 3582A manufactured by HEWLETT PACKARD; or a network analyzer in the audio range of 20-20,000 Hz, for example model number 8903A manufactured by HEWLETT PACKARD.

FIG. 1 illustrates a simple four-channel audio mixer having four input channels 1, 2, 3, 4 and one mix output 5. Four mixing faders 6, 7, 8, and 9 are associated with channels 1, 2, 3, 4, respectively. These mixing faders control the amplitude of a signal passing through input channel 1 to output channel 5. The relative mix or balance between the four inputs at output 5 is determined by the relative levels or settings of each mixing fader. Each mixing fader can be a variable resistor. In addition, four resistors, 11, 12, 13, and 14 are positioned between mixing faders 6, 7, 8, and 9, respectively, and an amplifier 15. The four resistors 11-15 and amplifier 15 comprise the active combining network 10 for combining signals from the four input channels into one output signal.

At the beginning of a recording session the operator of the audio mixer manipulates the settings on the four mixing faders 6-9 until the proper sounded balance is heard at output 5.

In order to record these settings of the controls of mixers 6-9 for future reference the following method of the present invention is followed. First, input channels 1-4 are disconnected from all signals entering therethrough. Second, a test signal oscillator 16 is connected to a level meter 17 and the level or amplitude of a first test signal produced by test signal oscillator 16 is measured. The level or amplitude measured by level meter 17 is recorded as a "level test signal" or a recorded base first test signal by a personal computer which is attached to the test oscillator 16 and AC level meter 17.

Third, the AC level meter 17 is attached to audio mixer output channel 5. Next, test signal oscillator 16 is connected to input channel 1, and the test signal oscillator 16 is turned on. As a result, test signal oscillator 16 produces a first test signal during a first period of time which is transmitted to input channel 1. Fourth, the level of the first test signal is measured by the AC level meter at output 5 and is recorded as the recorded first test signal 1. The path between input channel and audio mixer 5 is labelled path #1. In addition, it should be noted that in this embodiment, the parameter of the first test signal that is measured is the amplitude of the test signal. The first test signal produced by test signal oscillator 16 can also be defined by a plurality of parameters, each of which could be measured and recorded by a appropriate equipment which will be discussed below.

Next, test signal oscillator 16 is connected to input channel 2 and test oscillator 16 is turned on to produce a first test signal during a first period of time which is transmitted to input channel 2. The signal level at the audio mixer output 5 is measured by AC level meter 17 and recorded as recorded first test signal 2, because the path between input channel 2 and output 5 is labelled as path #2. This process is then repeated for input channel 3 and input channel 4. If desired, test oscillator 16 can be attached to AC level meter 17 before each first test signal is transmitted to input channels 2–4. Furthermore, desired test oscillator 16 can be adjusted so that the first test signal transmitted through 2–4 is substantially identical to the first test signal transmitted through input channel 1.

The amplitudes of each of the first test signals through input channels 1–4 are recorded by personal computer 18 so that there is a record of the mix information of the four input channels of the audio mixer. For example, the level test signal produced by the test oscillator 16 before being transmitted into input channels 1–4 could be 4.00 dbm. In addition, level channel 1 (the amplitude of the first test signal as measured through path #1) could be 3.00 dbm, level channel 2 (the amplitude of the first test signal as measured through path #2) could be −5.25 dbm, level channel 3 (the amplitude of the first test signal as measured through path #3) could be −7.43 dbm and level channel 4 (the amplitude of the first test signal as measured through path #4) could be −17.62 dbm. If desired the gain or loss through the four signal paths could be calculated by subtracting the level channels 1, 2, 3, 4 from the level test signal. Thus, the loss through the first input channel and path 1 is −1.00 dbm, the loss through path 2 and input channel 2 is −9.25 dbm, the loss through input channel 3 and path 3 is −11.43 dbm, and the loss through path 4 and input channel 4 is −21.62 dbm. As a result, one can calculate the exact amount of signal loss or gain through paths #1–4.

At a later time, designated as a second period of time which is later than the first period of time, when the operator of the audio mixer wishes to reestablish the previous initial settings on the audio mixer during the first time period, the operator first disconnects input channels 1–4 from all signals. Next, the output of test oscillator 16 is again measured by AC level meter 17 and the output of the test oscillator is measured and recorded as the current signal level. If this current level is different than the level test signal the operator can manipulate the controls of test signal oscillator 16 so as to make the parameters of the current test signal substantially sequal to the parameters of the level test signal. Alternatively, if the operator does not wish to perform this step, the operator can then use this current test signal as outlined below. However, the results achieved at the output of the audio mixer must be corrected for the difference between the current test signal and the level test signal.

Test signal oscillator 16 is next connected to input channel 1 during a second period of time and one parameter of this second test signal, i.e. its amplitude, is measured by AC level meter 17 at output channel 5. The AC amplitude of this second test signal at output 5 is viewed by the operator on a ditigal or analog display or on a cathode ray tube (CRT) as a graphic representation. This graphic representation of the amplitude of the second test signal at output 5 is compared with the recorded first test signal through channel 1. This can be accomplished by displaying the recorded first test signal adjacent to the second test signal on the CRT, or having the personal computer compare the two signals. The operator then manipulates fader 6 until the AC level of the second test signal at output 5 through channel 1 matches the level of the recorded first test signal of channel 1. When this point is reached the setting for mixing fader 6 has been returned to the its initial setting during the first period of time.

Next, test signal oscillator 16 is connected to input channel 2 and one parameter of the second test signal during the second period of time, i.e. its amplitude, is measured by AC level meter 17 at output 5. The amplitude of this second test signal through path #2 is viewed by the operator again on a digital or analog meter or it is displayed as graphic representation on a cathode ray tube. This second test signal that is displayed during the second period of time is compared by the operator with the previously recorded first signal through path #2. As a result of this comparison, the operator manipulates mixing fader 7 until the amplitude of the second test signal through input channel 2 at output 5 is equal to the amplitude of the test signal transmitted through input channel 2 and recorded at output 5. When the two levels match, the setting for mixing fader 7 has been returned to its original, initial position during the first period of time. This process is repeated for channels 3 and 4. When this is accomplished the four mixing faders have been returned to their previous settings and the balance heard at output 5 will be the same balance that was recorded and documented earlier during the first time period.

If desired, the operator can test the level of the signal produced by test oscillator 16 during the second period of time with the AC level meter to insure that the second test signal passing through input channel 1 is substantially identical to the first test signal and to the second test signal passing through channels 2–4. In the event the second test signal produced by oscillator 16 is different than the first test signal or is different than the second test signals transmitted through channels 2–4, the controls of oscillator 16 can be manipulated to ensure that the second test signal transmitted through input channels 1–4 is substantially equal to the first test signals transmitted to input channels 1–4.

It should be noted, that the controls for mixing faders 6–9 are altered in the event that at least one parameter of the second test signal, in this particular instance the amplitude at output channel 5, during the second period of time is different than the value of at least one parameter (the amplitude) of the recorded first test signal through the same channel. If there has been no change in the settings of the mixing faders between the first and second periods of time, then of course the second test signal at output 5 will be identical to the recorded first test signal and therefore it will not be necessary to change the settings of mixing faders 6–9.

Figure 2:
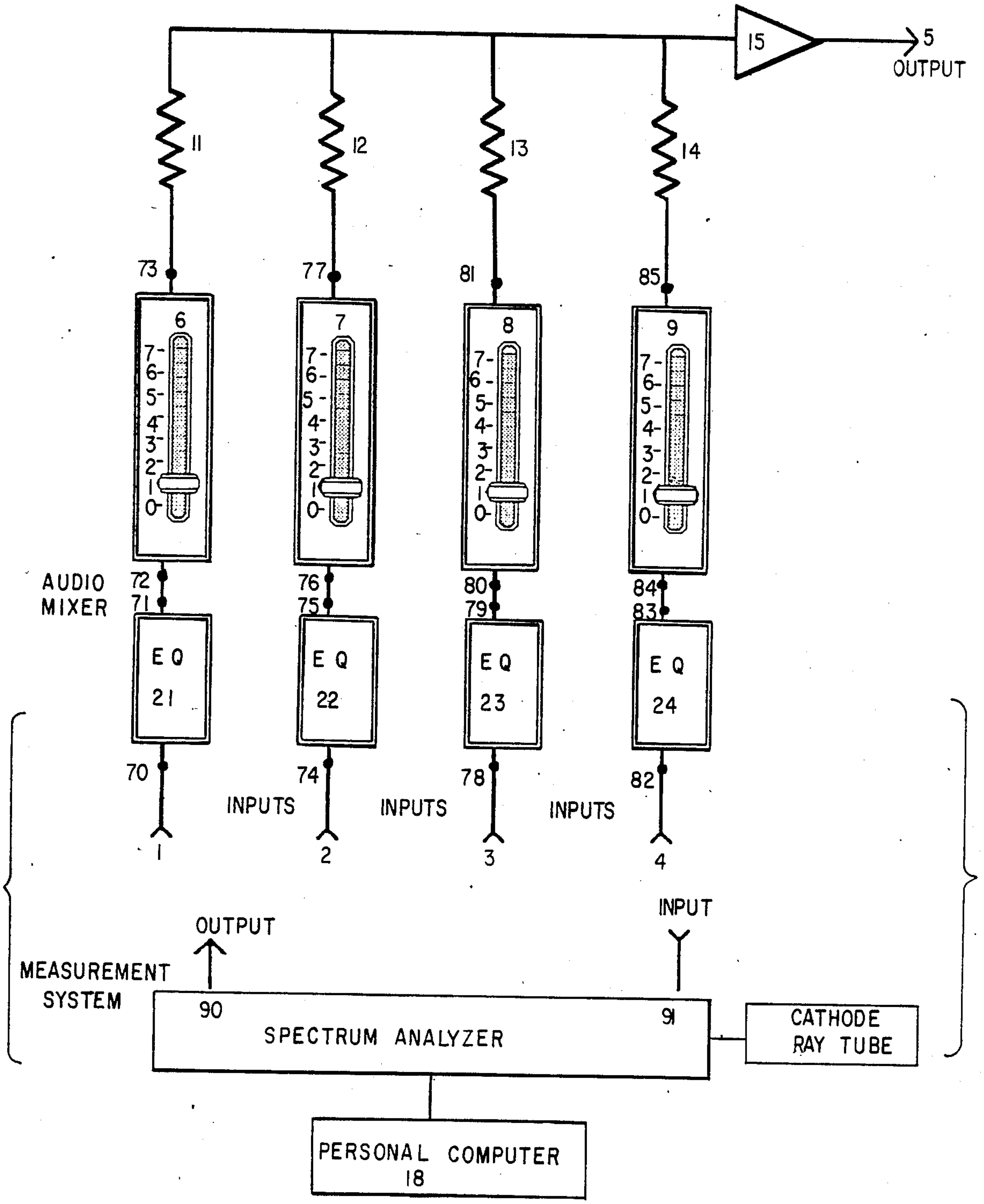
FIG. 2 illustrates a schematic signal flow diagram of a simple audio mixer having four input channels and equalization controls, and which also illustrates a second embodiment of the present invention for producing and transmitting an input signal into the four input channels and recording and measuring signals at the output of the audio mixer.

FIG. 2 illustrates a second embodiment of the present invention: FIG. 2 illustrates a four-channel mixer having equalization controls which are positioned between the input channels and the mixing faders. The same reference numerals used to describe the audio mixer and the measurement and recording equipment in FIG. 1 have been used in FIG. 2, and the same reference numerals are used in FIGS. 3–7 as in FIG. 1 for similar or identical elements. Thus, the audio mixer shown has four input channels 1–4 and one mix output 5. Four mixing faders 6–9 again determine the relative mix or balance between the four input channels 1–4. Active combining network 10 comprises the four resistors 11–14 and the amplifier 15. In addition, also provided are four equalizers 21, 22, 23, and 24 which are attached between respectively, input channel 1 and mixing fader 6, input channel 2 and mixing fader 7, input channel 3 and mixing fader 8, and input channel 4 and input fader 9.

Each equalizer comprises an input and an output. Equalizer 21 comprises an input 70 and an output 71. Equalizer 22 comprises an input 74 and an output 75. Equalizer 23 comprises an input 78 and an output 79. Equalizer 24 comprises an input 82 and an output 83. A signal transmitted through input channel 1 passes into equalizer 21, through input 70. Equalizer 21 may change the transfer function of a signal passing therethrough by changing the amplitude of the test signal at different frequencies. A signal passing out of equalizer 21 at output 71 enters input 72 of mixing fader 6 and is then transmitted through mixing fader 6 to output 73 of mixing fader 6 which connects to resistor 11 of the active combining network. Similarly, mixing fader 7 comprises an input 76 which receives input from the output 75 of equalizer 22. Mixing fader 7 also comprises an output 77 which is connected to resistor 12. Similarly, mixing faders 8 and 9 comprise respectively inputs 80 and 84 which are connected to outputs 79 and 83, respectively, of equalizers 23 and 24. Also, mixing faders 8 and 9 comprise outputs 81 and 85 respectively, which are connected, respectively, to resistors 13 and 14 of the active combining network.

In order to reestablish previously established settings on the controls of both the equalizers and the mixing faders, a different embodiment of the present invention is used. In this embodiment the means for producing the test signals is not an oscillator but rather a spectrum analyzer sweep oscillator. The sweep oscillator produces a test signal that can have the same amplitude at different frequencies. In addition, a spectrum analyzer is provided to measure the amplitude of the test signals at different frequencies. The amplitudes of different frequencies of various test signals at output 5 are recorded with personal computer 18 which is connected to the spectrum analyzer, and are displayed on CRT 92 also connected to personal computer 18.

Thus, the test signals which are produced by the spectrum analyzer sweep oscillator are defined by a plurality of parameters, in this specific case by amplitude and frequency.

In using this type of four-channel audio mixer, the desired mix achieved by the operator of the mixer during the first period of time is achieved by establishing initial settings on the controls of the four mixing faders 6–9 and also establishing initial settings for the controls to equalizers 21–24.

After these first initial settings are established on the mixing faders and on the equalizers, input channels 1–4 are disconnected from all signals that can be transmitted therethrough. Next, the spectrum analyzer sweep oscillator output 90 is connected to and measured by the spectrum analyzers measurement input 17 which measures the amplitude of different frequencies of output 90. This data is recorded as a level and spectrum test signal. Next, the spectrum analyzer input 91 is connected to audio mixer output 5.

Next, spectrum analyzer sweep oscillator output 90 is connected to input channel 1 so as to produce and to transmit through input channel 1 a first test signal during a first time period in which mixing faders 6–9 and equalizers 21–24 are set at their initial settings. This first test signal that is transmitted through input channel 1 is measured by input 91 of the spectrum analyzer at output 5 and is recorded by personal computer 18 as level and spectrum 1, which represents a measurement of the amplitude at a plurality of frequencies of the first test signal through input channel 1. The path from input channel 1 to output 5 is labelled path 190 1.

After the level and spectrum 1 is recorded by personal computer 18, spectrum analyzer output 90 is next connected to input channel 2 and again the transfer function of this first test signal through input channel 2 is measured by the spectrum analyzer as the first test signal leaves output 5 and is transmitted into input 91 of the spectrum analyzer. This first test signal passing through channel 2 and path #2 represents the path of the first test signal through equalizer 22 and mixing fader 7 and is called level and spectrum 2.

This process is repeated for input channels 3 and 4 so as to produce a level and spectrum 3 and a level and spectrum 4 which represent the transfer function of the first test signal as the first test signal passes through input channel 3 and path #3 and input channel 4 and path #4.

At this point the operator of the present invention has completely recorded all of the mix information for the four input channels.

At a later, second period of time when the setting of the controls of mixing faders 6–9 and/or equalizers 21–24 have been changed to a second setting, the operator of the audio mixer may desire to reestablish the mix of the audio mixer that existed during the first time period. This is accomplished by re-setting the mixing faders and equalizers to their previous initial setting. In order to accomplish this goal the operator must first disconnect input channels 1–4 from all signals. Next, the spectrum analyzer sweep oscillator output 90 is attached to input 91 and produces a second test signal. If, after comparing the second test signal measured by the spectrum analyzer with the first test signal, it is found that the second test signal is substantially different than the first test signal, then the controls on the sweep oscillator are manipulated so as to alter the second test signal so that the second test signal is substantially identical to the first test signal. This comparison is accomplished by comparing the second test signal with the recorded level and spectrum test signal (i.e. the first test signal) that has been recorded in the personal computer.

Next, this second test signal which is substantially identical to the first test signal is transmitted through input channel 1, and the transfer function of the second test signal at output 5 is measured by the spectrum analyzer. This measurement of the second test signal at output 5 is performed by attaching input 91 of the spectrum analyzer to output 5. The transfer function of the second test signal at output 5 through input channel 1 and path #1 is displayed on a cathode ray tube 92 as a graphic representation. In addition, the previously recorded level and spectrum 1 which represents the transfer function of the first test signal passing through channel 1 is also displayed on the cathode ray tube so that a direct comparison can be made between the two signals as is seen, for example in FIG. 5. As a result of the operator comparing the first and second test signals at output 5 that have passed through path #1, the operator will manipulate mixing faders 6 and equalizer 21 until the two graphs seen in FIG. 5 match, or in other words until the differences between the two graphs have been nulled out. It should be noted that mixing faders 6–9 and equalizers 21–24 will be manipulated in the event that at least one frequency of the second test signal has an amplitude different than at least one frequency of the first test signal for the same channel.

This process is repeated for channels 2, 3, and 4. After this process is completed, the settings on the controls of the audio mixer have been returned to their previous initial setting and the balance heard at input 5 will be the same as the balance that was recorded and documented during the first period of time.

An alternative method can be used to reestablish the previously established initial settings on the controls of the audio mixer. In this alternative embodiment of the method, two recordings are made of the first test signal through each channel and path. The first recording of the first test signal occurs at the output 71 of equalizer 21 after output 90 transmits a first test signal to input channel 1. In order to record the output of equalizer 21 alone, input 91 of the spectrum analyzer is connected to output 71 of the equalizer. The output of equalizer 21 is analyzed by the spectrum analyzer and recorded in the personal computer 18 as equalizer level and spectrum 1. Then, output 90 is connected to input 72 of mixing fader 6 and input 91 is connected to output 73 of mixing fader 6. Thus, the first test signal transmitted from spectrum analyzer sweep oscillator passes only through mixing fader 6 so that only the output of mixing fader 6 at output 73 is transmitted into input 91 of the spectrum analyzer. This first test signal that passes only through mixing fader 6 is called mixing fader level and spectrum 1. It is also recorded in personal computer 18. This process is repeated for each equalizer 22, 23, and 24 and each mixing fader 77, 81 and 85. In still another embodiment when measuring the output of mixing faders 6–9 is permissible to connect input 91 to output 5 rather than outputs 73, 77, 81 and 85.

During a second period of time after the first period of time, this process is again repeated so that a second test signal is produced at output 90 and is transmitted into input channel 1. Input 91 of the spectrum analyzer is again attached to output 71 to obtain a second equalizer level and spectrum 1 which is displayed on a cathode ray tube. The first test signal that was recorded at output 71 of equalizer 21 is then recalled from the memory of personal computer 18 and is also displayed on the cathode ray tube. The equalizer controls of equalizer 21 are then manipulated until the second level equalizer and spectrum 1 is substantially identical to the first equalizer level and spectrum 1. This process is repeated with mixing fader 6, equalizer 22, mixing fader 7 equalizer 23, mixing fader 8 equalizer 24, and mixing fader 9 until the settings on each of these controls are substantially identical to the settings that were initially established.

Figure 6:
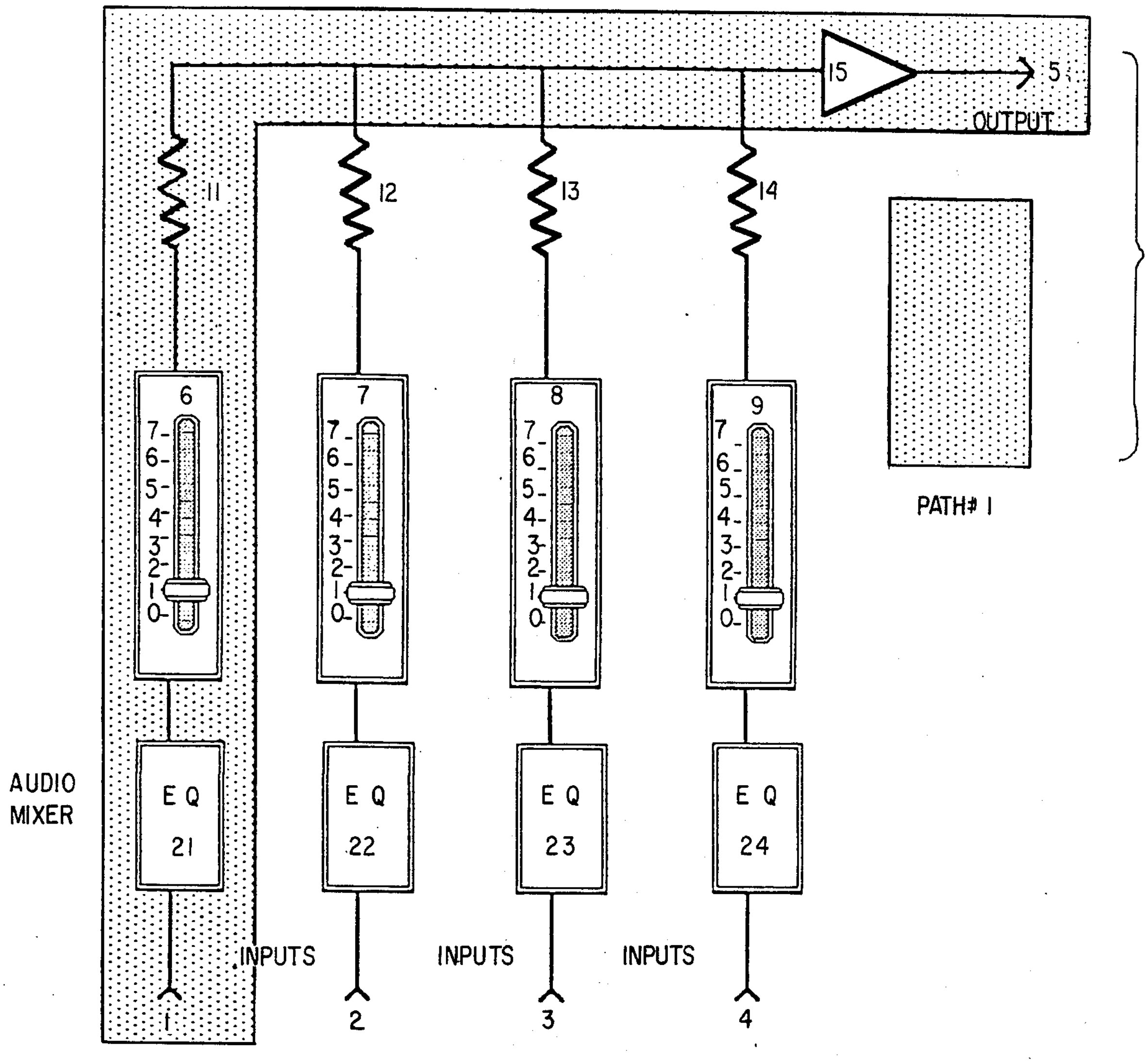
FIG. 6 illustrates a schematic signal flow diagram of a simple four-channel audio mixer shown in FIG. 2, showing a shaded path #1 through the audio mixer.

In order to better visualize each path through this type of simple audio mixer having equalizers, FIG. 6 has been included so as to show path #1 from input channel 1 to output 5. It will be seen that path #1 represents the path the first and second test signals follow from input channel 1 to output channel 5.

Figure 3:
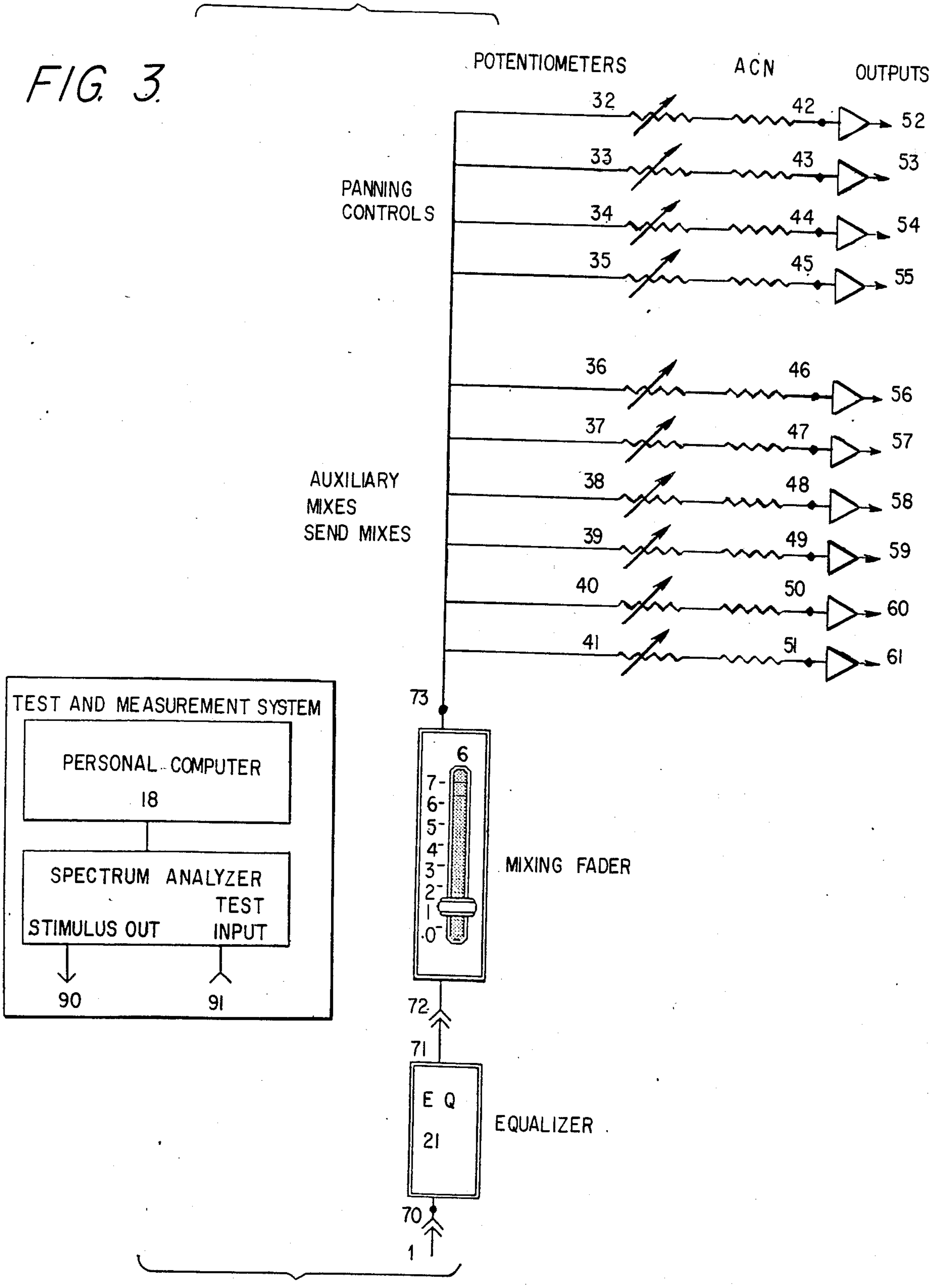
FIG. 3 illustrates a schematic signal flow diagram of a multi-channel audio mixer showing one input channel of the audio mixer of FIGS. 1 and 2 which is associated with ten output channels, and which also illustrates another embodiment of the present invention in which a spectrum analyzer sweep oscillator produces and transmits test signals to the one input channel, a personal computer records the output of the ten output channels, and a spectrum analyzer measures the output of the ten output channel.
Figure 4:
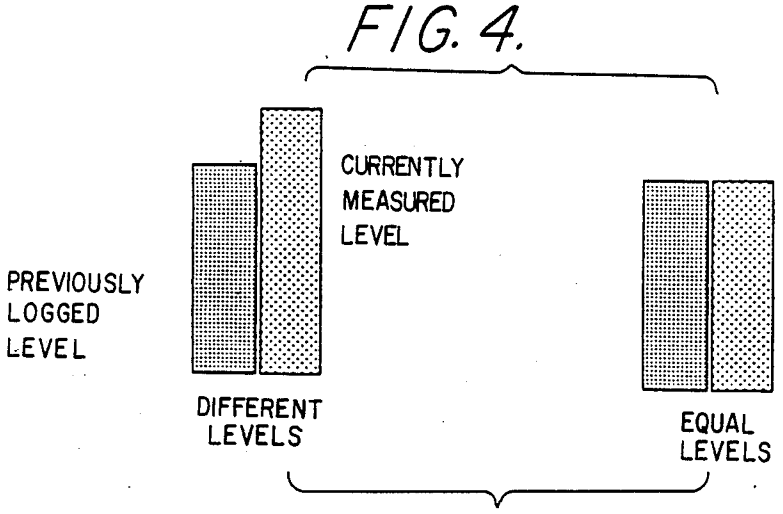
FIG. 4 is a graphic comparison of a first test signal recorded at the output of the audio mixer during a first time period, and a second test signal measured at the output of the audio mixer during a second time period, later than the first time period, and is also a graphic comparison of a first test signal recorded at the output of the audio mixer during a first time period, and the second test signal after the setting on the mixing fader has been altered to cause the second test signal to equal the recorded first test signals.
Figure 7:
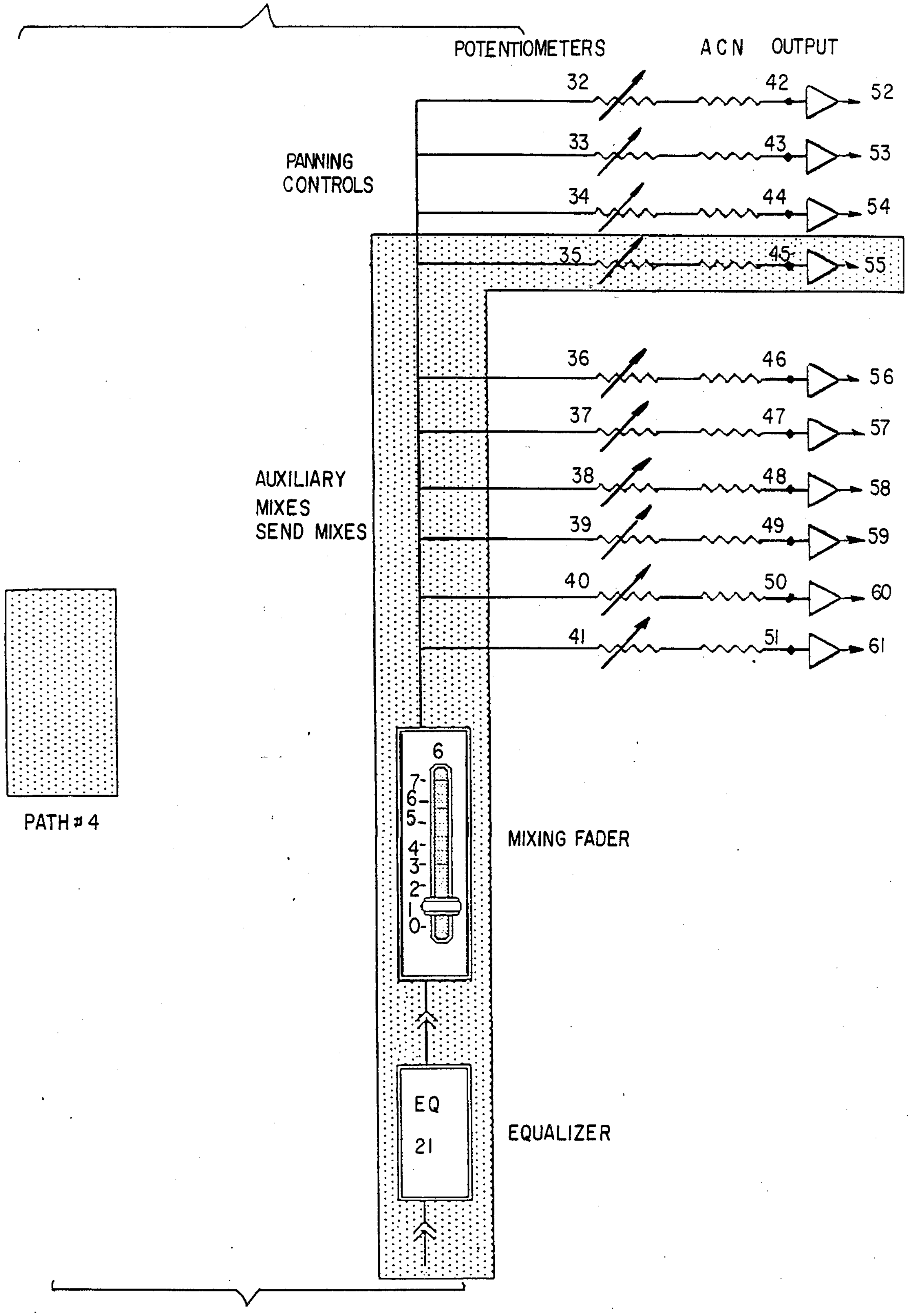
FIG. 7 illustrates a schematic flow diagram of the simple audio mixer shown in FIG. 3 in which input channel is associated with ten output channels and a path #4 is shown in a shaded area through the fourth output channel.

In still another embodiment, the apparatus and method of the present invention can be used with an audio mixer in which one or more of input channels 1–4 are associated with a plurality of outputs rather than one output as in the previous embodiments. This is illustrated in FIGS. 3 and 7 which show output channel 1 being connected to ten outputs 52–61. It is within the scope of the invention for the method and the apparatus of the present invention to be used with an audio mixer having more than 10 or less than 10 output channels associated with each input channel.

In the embodiments seen in FIG. 3 and FIG. 7 there are ten possible paths through which a signal can travel from input channel 1 to the output channels. These ten paths are labelled paths #1, #2, #3, #4, #5, #6, #7, #8, #9, #10 and correspond to output channels 52–61, and potentiometers 32–41, respectively. Thus, path #1 comprises potentiometer 32 and output channel 52, path #2 comprises potentiometer 33 and output channel 53, etc. FIG. 7 illustrates path #4 which includes potentiometer 35 and output 55.

Potentiometers 32–41 comprise the panning controls for the audio mixer. These panning controls are in the form of gang potentiometers, in which potentiometers 32 and 33 are on the same shaft so that when potentiometer 32 is turned upwardly on the shaft, potentiometer 33 is turned downwardly in the opposite direction. This also true of potentiometers 34 and 35 which are also on the same shaft and are gang potentiometers. Potentiometers 32–33 determine the left to right stereo positioning of the output signal and potentiometers 34–35 control, for example, the front and rear positioning of the output signal in the case of a quadraphonic system.

Potentiometers 36–41 comprise controls for determining the strength of the signal sent to head phones and to an echo means for adding echo to the signal.

Potentiometers 32–41 include controls which can be manipulated by the operator along with the controls for the mixing fader and the equalizers. The resistors that are positioned after the potentiometers 32–41 in combination with the amplifiers at output 52–61 comprise the active combining network for this audio mixer. Points 42–51 comprise summing points which are connected to channels 1–4 and which therefore sum the signals from the various input channels after the signals pass through the equalizer, the mixing fader, and the potentiometer, and before the signals travel to outputs 52–61.

As in the previous embodiments, the operator establishes an initial mix of sound by manipulating the controls to equalizers 21, mixing fader 6, and potentiometers 32–41 until the proper sound balance is heard at output channels 52–61. Next, input channel 1 and the other input channels are disconnected from all sources of signals. Spectrum analyzer stimulus test signal output 90 is then connected to test input 91 so as to measure and record a first level test signal. The following procedure should then be followed for each input channel of the mixing console, one at a time.

First, the spectrum analyzer test input analyzer 91 is connected to the output of equalizer 21 as in the previous embodiment. Next, a first test signal is generated by the spectrum analyzer sweep oscillator and is transmitted from output 90 into input channel 1. As a result, the transfer function of the first test signal at equalizer output 73 is measured by the spectrum analyzer and recorded as spectrum 1. Next the spectrum analyzer sweep oscillator output 90 is connected to input 72 of the mixing fader 6 and input 91 is connected to output 73 of the mixing fader 6. As a result, the transfer function of the first test signal during the first period of time through mixing fader 6 alone is measured by the spectrum analyzer and recorded as level and spectrum 1. Alternatively, after the first signal at output 71 of equalizer 21 has been measured and recorded output 90 of the spectrum analyzer can be attached to the input of equalizer 21 and input 91 of the spectrum analyzer could be attached to output 73 of mixing fader 6. By subtracting the first test signal transmitted through equalizer 21 alone from the first test signal transmitted through equalizer 21 and fader 6, one can obtain the transfer function of the first test signal being transmitted between the input and output of mixing fader 6. The output of each of these elements of the audio mixer is recorded in the memory of a personal computer.

Next, output 90 can be connected to the input of potentiometer 32 and input 91 is connected to either the output of potentiometer 32 or output 52. The first test signal is then transmitted through potentiometer 32 and the transfer function of the first test signal is measured by the spectrum analyzer and is recorded in the personal computer 18. Alternatively, once the transfer function of the first test signal through fader 6 and equalizer 21 has been measured and recorded one can connect output 90 to input channel 1 so as to obtain the transfer function of the first test signal during the first period of time through equalizers 21, mixing fader 6, and potentiometer 32. By subtracting this transfer function passing through these three elements from the transfer function measured at output 73 of mixing fader 6 one can obtain the transfer function for potentiometer 32. Personal computer 18 can be programmed to perform such a subtraction of the various transfer functions, and can record the transfer function of the first test signal passing through potentiometer 32.

Next, one connects output 90 to the input of potentiometer 33 and one connects test input 91 to the output of potentiometer 33 so as to measure and record the first test signal as it passes through potentiometer 33 alone. This transfer function is recorded in personal computer 18. This process is repeated for potentiometer 34–41.

This process is repeated for the other input channels which can include an equalizer, a mixing fader and a plurality of additional controls including potentiometers representing panning controls and auxilliary and send mixes.

At a later second period of time the setting on some or all of the controls of the equalizer, the mixing fader and the various potentiometers can be changed to another setting, different from the initial setting during the first period of time. In order to reestablish these previously established settings on the various controls, spectrum analyzer output 90 produces a second test signal which is substantially identical to the first test signal. This substantial identity between the first and second test signal can be confirmed by connected output 90 to input 91. If there is substantial discrepency between the two signals the spectrum analyzer output 90 can be altered so as to produce an substantial identity between these two signals.

Next, input 91 of the spectrum analyzer is connected to the output 71 of equalizer 21 and output 90 of the spectrum analyzer is connected to the input to the equalizer. The test signal at the output of equalizer 21 is then viewed on a cathode ray tube 18 as a graphic representation of the amplitude of the second test signal at plurality of frequencies. In addition, the personal computer displays the first test signal measured at output 71 of equalizer 21 on cathode ray tube 18 so that the first and second test signals at output 71 of equalizer 21 can be compared. As a result of this comparison, the operator manipulates the controls on equalizer 21 so as to substantially match the first and second test signals that are displayed so that the amplitude of the second test signal that is displayed at all frequencies viewed on tube 18 (20–20,000 Hz) is substantially equal to the amplitude of the plurality of frequency of the first test signal that is displayed.

Figure 5:
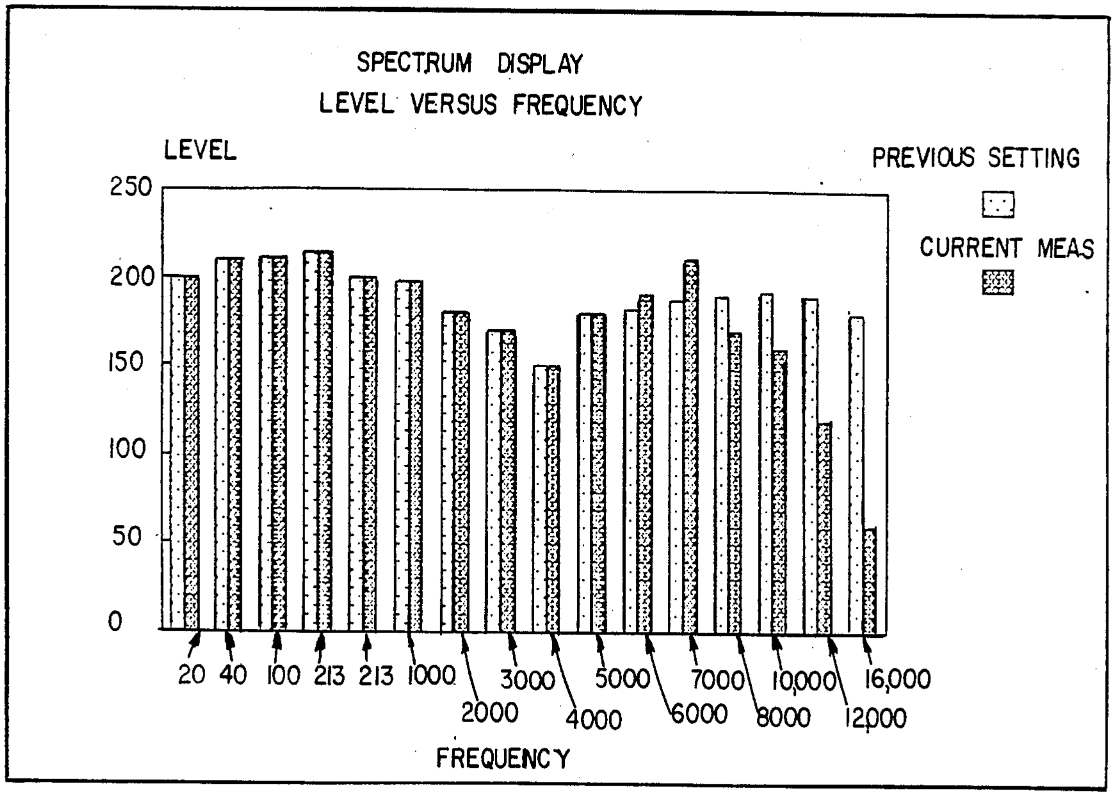
FIG. 5 illustrates a graphic representation of two frequency spectrums, one frequency spectrum representing a first test signal recorded at the output of the audio mixer during the first period of time, and the second frequency spectrum representing a second test signal measured at the output of the audio mixer during the second period of time later than the first period of time.

Next, output 90 of the spectrum analyzer is attached to input 72 of mixing fader 6 and input 91 of the spectrum analyzer is connected to output 73 of mixing fader 6 so as to measure and display the second test signal at the output of mixing fader 6 on cathode ray tube 18. This display, which can be in the form of a graphic representation as seen in FIG. 5, is then compared to a graphic representation of frequency versus amplitude of the first test signal passing between the input and output of mixing fader 6 which is displayed on the cathode ray tube as it is read from the memory of personal computer 18. As a result of this comparison, the controls of the mixing fader are manipulated until the two graphic representations of the first and second displayed test signals are substantially equal. This process is repeated for potentiometers 32–41 so that output 90 is connected to the input of potentiometers 32–41 and input 91 is connected to the output of potentiometers 32–41, one at a time, so as to obtain the transfer function of the second test signal across potentiometers 32–41 individually. When this process has been completed, the setting of the controls of potentiometers 32–41 will have been returned substantially to their initial setting. Of course, it is within the scope of the invention to apply this method and this apparatus to any set of controls on an audio mixer.

It is also within the scope of the invention to produce first and second test signals that are defined by more than two parameters, and to measure, record and display more than two parameters of the first and second test signals.

The present invention has been described above with particular reference to several illustrative embodiments, but it should be understood that variations and modifications can be effected without departing from the scope of the present invention and it should also be understood that the present invention extends to all equivalents within the scope of the claims.

What is claimed is:

1. A method for determining and recording the settings on the controls of a circuit in an audio mixer, wherein said circuit processes audio signals and comprises an input and output, wherein said controls control the value of at least one parameter of said audio signals through said circuit, wherein said method comprises:

(a) transmitting a first test signal defined by at least one parameter through said input into and through said circuit during said first period of time; and (b) recording said first test signal at said output of said circuit during said first period of time.

2. The method defined by claim 1 further comprising the steps of:

(c) transmitting a second test signal through said at least one input during a second time period later than said first time period, wherein said second test signal is defined by at least one parameter substantially identical to said at least one parameter of said first test signal; and (d) comparing said second test signal at said at least one output during said second period of time with said recorded first test signal.

3. The method defined by claim 2, wherein said method comprises a method of reestablishing previously established settings on the controls of a circuit in an audio mixer, wherein said method further comprises the steps of:

(e) altering the settings of said controls during said second period of time in the event that the value of said at least one parameter of said second test signal at said at least one output channel during said second period of time is different than the value of said at least one parameter of said recorded first test signal so that the value of said at least one parameter of said second test signal at said at least one output channel is substantially identical to the value of said at least one parameter of said recorded first test signal.

4. The method defined by claim 3 further comprising the step of:

measuring and recording said at least one parameter of said first test signal before said first test signal is transmitted through said at least one input during said first time period to produce a recorded base level first test signal; and measuring said at least one parameter of said second test signal before step (c) and after step (b).

5. The method defined by claim 4 further comprising the steps of:

comparing the value of said at least one parameter of said recorded base level first test signal to the value of said at least one parameter of said second test signal before step (c) and after step (b); and altering said second test signal before step (c) and after step (b) in the event that the value of said at least one parameter of said recorded base level first test signal is different than the value of said at least one parameter of said second test signal so that the value of said at least one parameter of said second test signal before step (c) and after step (b) is substantially identical to the value of said at least one parameter of said recorded base level first test signal.

6. The method defined by claim 3 further comprising the step of:

disconnecting said at least one input from all sources of signals before transmitting said first test signal through said at least one input during said first period of time and disconnecting said at least one input from all sources of signals before transmitting said second test signal through said at least one input during said second period of time.

7. The method defined by claim 6 further comprising the steps of:

establishing a first setting for said controls of said audio mixer before step (a);

establishing a second setting for said controls of said audio mixer after step (b) and before step (c); and reestablishing said first setting by performing step (e).

8. The method defined by claim 7 wherein said at least one parameter of said first and second signals comprises the amplitude of said first and second test signals, respectively.

9. A method of reestablishing previously established settings on the controls of an audio mixer, wherein said audio mixer comprises at least one input channel and at least one output channel associated with said at least one input channel, wherein said controls control the value of at least one parameter of signals transmitted from said at least one input channel to said at least one output channel, wherein said method comprises the steps of:

(a) transmitting a first test signal defined by at least one parameter through said at least one input channel during a first time period;

(b) recording said first test signal at said at least one output channel during said first time period;

(c) transmitting a second test signal through said at least one input channel during a second time period later than said first time period, wherein said second test signal is defined by at least one parameter substantially identical to said at least one parameter of said first test signal;

(d) comparing said second test signal at said at least one output channel during said second period of time with said recorded first test signal; and (e) altering the settings of said controls during said second time period in the event that the value of said at least one parameter of said second test signal at said at least one output channel during said second period of time is different than the value of said at least one parameter of said recorded first test signal so that the value of said at least one parameter of said second test signal at said at least one output channel is substantially identical to the value of said at least one parameter of said recorded first test signal, wherein said method further comprises the steps of:

establishing a first setting for said controls of said audio mixer before step (a);

establishing a second setting for said controls of said audio mixer after step (b) and before step (c); and reestablishing said first setting by performing step (e), wherein said first test signal is defined by a plurality of parameters, and wherein said second test signal is defined by a plurality of parameters substantially identical to said plurality of parameters defining said first test signal, wherein said controls comprise means for altering the values of said pluraity of parameters of said first and second test signals as said first and second test signals are transmitted from said at least one input channel to said at least one output channel, wherein step (e) comprises the step of:

altering the settings of said controls during said second time period in the event that the value of at least one of said plurality of parameters of said second test signal at said at least one output channel is different from the value of a substantially identical parameter of said recorded first test signal so that the value of each of said plurality of parameters of said second test signal at said at least one output channel is substantially identical to the value of a substantially identical parameter of said recorded first test signal.

10. A method of reestablising previously established settings on the controls of an audio mixer, wherein said audio mixer comprises at least one input channel and at least one output channel associated with said at least one input channel, wherein said controls control the value of at least one parameter of signals transmitted from said at least one input channel to said at least one output channel, wherein said method comprises the steps of:

(a) transmitting a first test signal defined by at least one parameter through said at least one input channel during a first time period;
(b) recording said first test signal at said at least one output channel during said first time period;
(c) transmitting a second test signal through said at least one input channel during a second time period later than said first time period, wherein said second test signal is defined by at least one parameter substantially identical to said at least one parameter of said first test signal;
(d) comparing said second test signal at said at least one output channel during said second period of time with said recorded first test signal; and
(e) altering the settings of said controls during said second time period in the event that the value of said at least one parameter of said second test signal at said at least one output channel during said second period of time is different than the value of said at least one parameter of said recorded first test signal so that the value of said at least one parameter of said second test signal at said at least one output channel is substantially identical to the value of said at least one parameter of said recorded first test signal, wherein said method further comprises the steps of:
establishing a first setting for said controls of said audio mixer before step (a);
establishing a second setting for said controls of said audio mixer after step (b) and before step (c); and
reestablishing said first setting by performing step (e), wherein one of said plurality of parameters defining said first and second test signals comprises the amplitude of said first and second test signals, respectively, and another of said plurality of parameters defining said first and second test signals, comprises the frequency of said first and second test signals, respectively, wherein said controls comprises means for controlling said amplitude and said frequency of said first and second test signals transmitted from said at least one input channel to said at least one associated output channel,
wherein step (b) comprises the step of recording said amplitude of said first test signal at a plurality of frequencies at said at least one output channel during said first period of time;
wherein step (d) comprises the step of comparing said amplitude of said second test signal at said at least one output channel during said second period of time at a plurality of frequencies with said amplitude of said recorded first test signal at the same plurality of frequencies; and
wherein step (e) comprises the step of altering the settings of said amplitude and/or frequency control means in the event that the amplitude of said second test signal at said at least one output channel at at least one frequency is different than the amplitude of said recorded first test signal at that same frequency so that the amplitude of said second test signal at said at least one output channel at said plurality of frequencies is substantially identical to the amplitude of said recorded first test signal at the same plurality of frequencies.

11. The method defined by claim 10
wherein said step of establishing said first setting comprises establishing a first setting on said amplitude and said frequency control means;
wherein said step of establishing said second setting comprises establishing a second setting on said amplitude and frequency control means; and
wherein said step of reestablishing said first setting comprises reestablishing said first setting of said amplitude and frequency control means.

12. A method of reestablishing previously established settings on the controls of an audio mixer, wherein said audio mixer comprises at least one input channel and at least one output channel associated with said at least one input channel, wherein said controls control the value of at least one parameter of signals transmitted from said at least one input channel to said at least one output channel, wherein said method comprises the steps of:
(a) transmitting a first test signal defined by at least one parameter through said at least one input channel during a first time period;
(b) recording said first test signal at said at least one output channel during said first time period;
(c) transmitting a second test signal through said at least one input channel during a second time period later than said first time period, wherein said second test signal is defined by at least one parameter substantially identical to said at least one parameter of said first test signal;
(d) comparing said second test signal at said at least one output channel during said second period of time with said recorded first test signal; and
(e) altering the settings of said controls during said second time period in the event that the value of said at least one parameter of said second test signal at said at least one output channel during said second period of time is different than the value of said at least one parameter of said recorded first test signal so that the value of said at least one parameter of said second test signal at said at least one output channel is substantially identical to the value of said at least one parameter of said recorded first test signal, wherein said method further comprises the steps of:
establishing a first setting for said controls of said audio mixer before step (a);
establishing a second setting for said controls of said audio mixer after step (b) and before step (c); and
reestablishing said first setting by performing step (e), wherein one of said plurality of parameters defining said first and second test signals comprises the amplitude of said first and second test signals and another of said plurality of parameters defining said first and second test signals comprises the frequency of said first and second test signals, wherein said controls comprises an equalizer for controlling said amplitude of said first and second test signals at a plurality of frequencies after said first and second test signals are transmitted to said input channel, wherein said equalizer comprises an input and an output, wherein said controls further comprise a mixing fader for controlling the amplitude of said first and second test signals at said output of said equalizer and at said output channel, wherein said mixing fader comprises an input and an output, wherein step (b) comprises the steps of recording said amplitude of said first test signal at a plurality of frequencies at said output of said equalizer during said first period of time, and recording the amplitude of said first test signal at a plurality of frequencies at said output channel;

wherein step (d) comprises the step of comparing said amplitude of said second test signal at said output of said equalizer during said second period of time at a plurality of frequencies with said amplitude of said recorded first test signal at the same plurality of frequencies at said output of said equalizer and comparing said amplitude of said second test signal at said output channel during said second period of time at a plurality of frequencies with said amplitude of said recorded first test signal at the same plurality of frequencies at said output channel;

wherein step (e) comprises the steps of:

(i) altering the setting of said equalizer in the event that the amplitude of said second test signal at said output of said equalizer at at least one frequency is different than the amplitude of said recorded first test signal at that same frequency at said output of said equalizer so that the amplitude of said second test signal at said equalizer output at said plurality of frequencies is substantially identical to the amplitude of said recorded first test signal at said plurality of frequencies at said equalizer output; and (ii) after step (i) altering the setting of said mixing fader in the event that the amplitude of said second test signal at said at least one output channel at at least one frequency is different than the amplitude of said recorded first test signal at that same frequency at said output channel so that the amplitude of said second test signal at said at least one output channel is substantially identical to the amplitude of said recorded first test signal at said plurality of frequencies at said at least one output channel.

13. The method defined by claim 12 further comprising the steps of:

transmitting said first test signal directly to said input of said mixing fader;

recording said first test signal at said output of said mixing fader;

transmitting a second test signal directly to said input of said mixing fader;

comparing said second test signal at said output of said mixing fader with said first test signal recorded at said output of said mixing fader; and altering the setting of said mixing fader during said second time period in the event that the amplitude of said second test signal at said output of said mixing fader is different from the amplitude of said first test signal recorded at said output of said mixing fader so that the amplitude of said second test signal at said output of said mixing fader is substantially identical to the amplitude of said first test signal recorded at said output of said mixing fader.

14. The method defined by claim 12 further comprising the steps of:

producing said first and second test signals with a spectrum analyzer sweep oscillator;

measuring said first and second test signals at said at least one output channel, and at the output of said equalizer and said mixing fader with said spectrum analyzer; and recording said first test signal with the memory of a personal computer.

15. The method defined by claim 12 wherein said audio mixer comprises a plurality of input channels, wherein said method further comprises the steps of:

performing steps (a), (b), (c), (d), and (e) for each input channel.

16. The method defined by claim 15 wherein said method further comprises the step of:

performing steps (a) and (b) during said first period of time for one input channel before performing steps (a) and (b) on each subsequent input input channel; and performing steps (c), (d) and (e) during said second period of time for one input channel before performing steps (c), (d), and (e) on each subsequent input channel and after performing steps (a) and (b).

17. The method defined by claim 16 wherein said audio mixer comprises a plurality of output channels associated with at least one of said input channels, and wherein each of said plurality of output channels is identified by a different integer p, wherein p is greater than 1 and less than n, wherein n is equal to one more than the number of said output channels, wherein step (a) comprises the step of transmitting said first test signal through said input channel associated with said n output channels, wherein step (b) comprises the step of recording said first test signal at said plurality of output channels seriatim during said first period of time to produce p recorded first test signals, wherein each of said recorded first test signals is identified by a different integer p so that said p'th recorded first test signal represents said first test signal at said p'th output channel, wherein said second test signal transmitted through said at least one input channel is transmitted to each of said p output channels to produce p second test signal outputs, wherein each of said second test signal outputs is identified by said integer p so that said p'th second test signal output represents the said second test signal at said p'th output channel during said second time period, wherein step (d) comprises the steps of:

(1) comparing said p'th recorded first test signal with said p'th second test signal output when P equals 1;

(2) repeating step (1) p times wherein each time step (1) is repeated p increases by one.

18. The method defined by claim 17 wherein at least one of said plurality of output channels comprises an additional control for altering at least one parameter of said first and second test signals as said first and second test signals are transmitted from said mixing fader to said one of said plurality of said output channels, wherein said additional control comprises an input and an output, wherein step (a) further comprises the step of transmitting said first test signal directly to said input of said additional control;

wherein step (b) further comprises the step of recording said first rest signal at said output of said additional control during said first time period;

wherein step (c) further comprises the step of transmitting a second test signal during said second time period directly to said input of said additional control;

wherein step (d) further comprises the step of comparing said second test signal at said output of said additional control with said first test signal recorded at said output of said additional control;

wherein step (e) further comprises the step of altering the setting on said additional control in the event that the value of said at least one parameter controlled by said additional control of said second test signal at said additional control output is different than the value of said at least one parameter of controlled by said additional control of said first test signal recorded at said output of said additional control so that the value of said at least one parameter controlled by said additional control of said second test signal at said additional control output is substantially identical to the valve of said at least one parameter controlled by said additional control of said first test signal recorded at said additional control output.

19. The method defined by claim 18 wherein said additional control comprises a panning control.

20. The method defined by claim 18 wherein said additional control comprises a send mix control.

21. The method defined by claim 1 wherein said at least one parameter comprises the amplitude of said first and second test signals, wherein said method further comprises the step of measuring the value of said amplitude of said first and second test signals with an AC level meter.

22. The method defined by claim 3 wherein said steps (a) and (c) comprise the step of transmitting said first and said second test signal during said first and second time periods, respectively, through said at least one input by an oscillator.

23. The method defined by claim 3 further comprising the steps of:

displaying said at least one parameter of said recorded first test signal and displaying said at least one parameter of said second test signal at said at least one output.

24. The method defined by claim 23 further comprising the steps of displaying said at least one parameter of said recorded first test signal on an AC level meter and displaying said at least one parameter of said second test signal on an AC level meter.

25. The method defined by claim 23 further comprising the steps of displaying said at least one parameter of said recorded first test signal as a graphic representation on a cathode ray tube, and displaying said second test signal at said at least one output as a graphic representation on a cathode ray tube.

26. The method defined by claim 3 further comprising the steps of:

establishing a first setting for said controls of said audio mixer before step (a);

establishing a second setting for said controls of said audio mixer after step (b) and before step (c); and reestablishing said first setting by performing step (e).

27. A method of reestablishing previously estabished settings on the controls of an audio mixer, wherein said audio mixer comprises at least one input channel and at least one output channel associated with said at least one input channel, wherein said controls control the value of at least one parameter of signals transmitted from said at least one input channel to said at least one output channel, wherein said method comprises the steps of:

(a) transmitting a first test signal defined by at least one parameter through said at least one input channel during a first time period;

(b) recording said first test signal at said at least one output channel during said first time period;

(c) transmitting a second test signal through said at least one input channel during a second time period later than said first time period, wherein said second test signal is defined by at least one parameter substantially identical to said at least one parameter of said first test signal;

(d) comparing said second test signal at said at least one output channel during said second period of time with said recorded first test signal; and (e) altering the settings of said controls during said second time period in the event that the value of said at least one parameter of said second test signal at said at least one output channel during said second period of time is different than the value of said at least one parameter of said recorded first test signal so that the value of said at least one parameter of said second test signal at said at least one output channel is substantially identical to the value of said at least one parameter of said recorded first test signal, wherein said first test signal is defined by a plurality of parameters, and wherein said second test signal is defined by a plurality of parameters substantially identical to said plurality of parameters defining said first test signal, wherein said controls comprise means for altering the values of said plurality of parameters of said first and second test signals as said first and second test signals are transmitted from said at least one input channel to said at least one output channel, wherein step (e) comprises the step of:

altering the settings of said controls during said second time period in the event that the value of at least one of said plurality of parameters of said second test signal at said at least one output channel is different from the value of a substantially identical parameter of said recorded first test signal so that the value of each of said plurality of parameters of said second test signal at said at least one output is substantially identical to the value of a substantially identical parameter of said recorded first test signal.

28. The method defined by claim 27 wherein one of said plurality of parameters defining said first and second test signals comprises the amplitude of said first and second test signal and another of said plurality of parameters defining said first and second test signals comprises the frequency of said first and second test signals, wherein said controls comprises means for controlling said amplitude and said frequency of said first and second test signals transmitted from said at least one input channel to said at least one associated output channel, wherein step (b) comprises the step of recording said amplitude of said first test signal at a plurality of frequencies at said one output channel during said first period of time;

wherein step (d) comprises the step of comparing said amplitude of said second test signal at said at least one output channel during said second period of time at a plurality of frequencies with said amplitude of said recorded first test signal at the same plurality of frequencies; and wherein step (e) comprises the step of altering the settings of said amplitude and/or frequency control means in the event that the amplitude of said second test signal at said at least one output channel at at least one frequency is different than the amplitude of said recorded first test signal at that same frequency so that the amplitude of said second test signal at said at least one output channel at said plurality of frequencies is substantially identical to the amplitude of said recorded first test signal at said plurality of frequencies.

29. The method defined by claim 27 wherein one of said plurality of parameters defining said first and second test signals comprises the amplitude of said first and second test signals and another of said plurality of parameters defining said first and second test signals comprises the frequency of said first and second test signals, wherein said controls comprises an equalizer for controlling said amplitude of said first and second test signals at a plurality of frequencies after said first and second test signals are transmitted to said input channel, wherein said equalizer comprises an input and an output, wherein said controls further comprise a mixing fader for controlling the amplitude of said first and second test signals at said output of said equalizer and at said output channel, wherein said mixing fader comprises an input and an output, wherein step (b) comprises the step of recording said amplitude of said first test signal at a plurality of frequencies at said output of said equalizer during said first period of time, and recording the amplitude of said first test signal at a plurality of frequencies at said output channel;

wherein step (d) comprises the step of comparing said amplitude of said second test signal at said output of said equalizer during said second period of time at a plurality of frequencies with said amplitude of said recorded first test signal at the same plurality of frequencies at said output of said equalizer and comparing said amplitude of said second test signal at said output channel during said second period of time at a plurality of frequencies with said amplitude of said recorded first test signal at the same plurality of frequencies at said output channel;

wherein step (e) comprises the steps of:

(i) altering the setting of said equalizer in the event that the amplitude of said second test signal at said output of said equalizer at at least one frequency is different than the amplitude of said recorded first test signal at that same frequency at said output of said equalizer so that the amplitude of said second test signal at said equalizer output at said plurality of frequencies is substantially identical to the amplitude of said recorded first test signal at said plurality of frequencies at said equalizer output; and (ii) after step (i) altering the setting of said mixing fader in the event that the amplitude of said second test signal at said at least one output channel at at least one frequency is different than the amplitude of said recorded first test signal at that same frequency at said output channel so that the amplitude of said second test signal at said at least one output channel is substantially identical to the amplitude of said recorded first test signal at said plurality of frequencies at said at least one output channel.

30. The method defined by claim 29 further comprising the steps of:

transmitting said first test signal directly to said input of said mixing fader;

recording said first test signal at said output of said mixing fader;

transmitting a second test signal directly to said input of said mixing fader;

comparing said second test signal at said output of said mixing fader with said first test signal recorded at said output of said mixing fader; and altering the setting of said mixing fader during said second time period in the event that the amplitude of said second test signal at said output of said mixing fader is different from the amplitude of said first test signal recorded at said output of said mixing fader so that the amplitude of said second test signal at said output of said mixing fader is substantially identical to the amplitude of said first test signal recorded at said output of said mixing fader.

31. The method defined by claim 3 wherein said audio mixer comprises a plurality of input channels for receiving and processing audio signals, wherein said method further comprises the steps of:

performing steps (a), (b), (c), (d), and (e) for each input channel.

32. The method defined by claim 31 wherein said method further comprises the step of:

performing steps (a) and (b) during said first period of time for one input channel before performing steps (a) and (b) on each subsequent input input channel; and performing steps (c), (d) and (e) during said second period of time for one input channel before performing steps (c), (d), and (e) on each subsequent input channel and after performing steps (a) and (b).

33. The method defined by claim 32 wherein said audio mixer comprises a plurality of output channels associated with at least one of said input channels, and wherein each of said plurality of output channels is identified by a different integer p, wherein p is greater than 1 and less than n, wherein n is equal to one more than the number of said plurality of output channels, wherein step (a) comprises the step of transmitting said first test signal through said at least one input channel associated with said n output channels, wherein step (b) comprises the step of recording said first test signal at said plurality of output channels seriatim during said first period of time to produce p recorded first test signals, wherein each of said recorded first test signals is identified by a different integer p so that said p'th recorded first test signal represents said first test signal at said p'th output channel, wherein said second test signal transmitted through said at least one input channel is transmitted to each of said p output channels to produce p second test signal outputs, wherein each of said second test signal outputs is identified by said integer p so that said p'th second test signal output represents the said second test signal at said p'th output channel during said second time period, wherein step (d) comprises the steps of:

(1) comparing said p'th recorded first test signal with said p'th second test signal output when p equals 1;

(2) repeating step (1) p times wherein each time step (1) is repeated p increases by one.

34. A method of reestablishing previously established settings on the controls of an audio mixer, wherein said audio mixer comprises at least one input channel and at least one output channel associated with said at least one input channel, wherein said controls control the value of at least one parameter of signals transmitted from said at least one input channel to said at least one output channel, wherein said method comprises the steps of:

(a) transmitting a first test signal defined by at least one parameter through said at least one input channel during a first time period;

(b) recording said first test signal at said at least one output channel during said first time period;

(c) transmitting a second test signal through said at least one input channel during a second time period later than said first time period, wherein said second test signal is defined by at least one parameter substantially identical to said at least one parameter of said first test signal;

(d) comparing said second test signal at said at least one output channel during said second period of time with said recorded first test signal; and (e) altering the settings of said controls during said second time period in the event that the value of said at least one parameter of said second test signal at said at least one output channel during said second period of time is different than the value of said at least one parameter of said recorded first test signal so that the value of said at least one parameter of said second test signal at said at least one output channel is substantially identical to the value of said at least one parameter of said recorded first test signal, wherein said audio mixer comprises a plurality of input channels, wherein said method further comprises the steps of:

performing steps (a), (b), (c), (d), and (e) for each input channel, wherein said method further comprises the step of:

performing steps (a) and (b) during said first period of time for one input channel before performing steps (a) and (b) on each subsequent input input channel; and performing steps (c), (d) and (e) during said second period of time for one input channel before performing steps (c), (d), and (e) on each subsequent input channel and after performing steps (a) and (b), wherein said audio mixer comprises a plurality of output channels associated with at least one of said input channels, and wherein each of said plurality of output channels is identified by a different integer p, wherein p is greater than 1 and less than n, wherein n is equal to one more than the number of said plurality of output channels, wherein step (a) comprises the step of transmitting said first test signal through said at least one input channel associated with said n output channels, wherein step (b) comprises the step of recording said first test signal at said plurality of output channels seriatim during said first period of time to produce p recorded first test signals, wherein each of said recorded first test signals is identified by a different integer p so that said p'th recorded first test signal represents said first test signal at said p'th output channel, wherein said second test signal transmitted through said at least one input channel is transmitted to each of said p output channels to produce p second test signal outputs, wherein each of said second test signal outputs is identified by said integer p so that said p'th second test signal output represents the said second test signal at said p'th output channel during said second time period, wherein step (d) comprises the steps of:

(1) comparing said p'th recorded first test signal with said p'th second test signal output when p equals 1;

(2) repeating step (1) p times wherein each time step (1) is repeated p increases by one, wherein at least one of said plurality of output channels comprises an additional control for altering at least one parameter of said first and second test signals as said first and second test signals are transmitted from said mixing fader to said one of said plurality of said output channels, wherein said additional control comprises an input and an output, wherein step (a) further comprises the step of transmitting said first test signal directly to said input of said additional control;

wherein step (b) further comprises the step of recording said first test signal at said output of said additional control during said first time period;

wherein step (c) further comprises the step of transmitting a second test signal during said second time period directly to said input of said additional control;

wherein step (d) further comprises the step of comparing said second test signal at said output of said additional control with said first test signal recorded at said output of said additional control;

wherein step (e) further comprises the step of altering the setting on said additional control in the event that the value of said at least one parameter controlled by said additional control of said second test signal at said additional control output is different than the value of said at least one parameter of controlled by said additional control of said first test signal recorded at said output of said additional control so that the value of said at least one parameter controlled by said additional control of said second test signal at said additional control output is substantially identical to said at least one parameter controlled by said additional control of said first test signal recorded at said additional control output.

35. The method defined by claim 3 wherein said audio mixer comprises a plurality of output channels associated with said at least one input channel, and wherein each of said plurality of output channels is identified by a different integer p, wherein p is greater than 1 and less than n, wherein n is equal to one more than the number of said output channels, wherein step (a) comprises the step of transmitting said first test signal through said at least one input channel, wherein step (b) comprises the step of recording said first test signal at said plurality of output channels seriatim during said first period of time to produce p recorded first test signals, wherein each of said recorded first test signals is identified by a different integer p so that said p'th recorded first test signal represents said first test signal at said p'th output channel, wherein said second test signal transmitted through said at least one input channel is transmitted to each of said p output channels to produce p second test signal outputs, wherein each of said second test signal outputs is identified by said integer p so that said p'th second test signal output represents the said second test signal at said p'th output channel during said second time period, wherein step (d) comprises the steps of:

(1) comparing said p'th recorded first test signal with said p'th second test signal output when p equals 1;

(2) repeating step (1) p times wherein each time step (1) is repeated p increases by one.

36. The method defined by claim 35 wherein at least one of said plurality of output channels comprises an additional control for altering at least one parameter of said first and second test signals as said first and second test signals are transmitted from said mixing fader to said one of said plurality of said output channels, wherein said additional control comprises an input and an output, wherein step (a) further comprises the step of transmitting said first test signal directly to said input of said additional control;

wherein step (b) further comprises the step of recording said first test signal at said output of said additional control during said first time period;

wherein step (c) further comprises the step of transmitting a second test signal during said second time period directly to said input of said additional control;

wherein step (d) further comprises the step of comparing said second test signal at said output of said additional control with said first test signal recorded at said output of said additional control;

wherein step (e) further comprises the step of altering the setting on said additional control in the event that the value of said at least one parameter controlled by said additional control of said second test signal at said additional control output is different than the value of said at least one parameter of controlled by said additional control of said first test signal recorded at said output of said additional control so that the value of said at least one parameter controlled by said additional control of said second test signal at said additional control output is substantially identical to said at least one parameter controlled by said additional control of said first test signal recorded at said additional control output.

37. The method defined by claim 36 wherein a plurality of said output channels comprises an additional control for altering at least one parameter of said first and second test signals as said first and second test signals are transmitted from said mixing fader to said one of said plurality of output channels, wherein said method further comprises the step of:

repeating steps (a), (b), (c), (d), and (e) for each additional control.

38. An apparatus for assisting a user of an audio mixer in reestablishing previously established settings on the controls of a circuit of said audio mixer, in combination with said audio mixer, wherein said audio mixer comprises a circuit and a plurality of controls for controlling said circuit, wherein said circuit processes audio signals and comprises a plurality of input channels and an output, and means for mixing a plurality of audio signals transmitted through said plurality of input channels in said output, wherein said controls control the value of at least one parameter of said audio signals transmitted through said circuit, wherein said apparatus comprises:

(a) means for producing a first test signal defined by at least one parameter;

(b) means for transmitting said first test signal through said input into and through said circuit during a first period of time; and (c) means for recording said at least one parameter of said first test signal at said output of said circuit during said first time period.

39. The apparatus defined by claim 38 wherein said producing means and said transmitting means comprises a frequency generator, and wherein said recording means comprises personal computer.

40. An apparatus for assisting a user of an audio mixer in reestablishing previously established settings on the controls of said audio mixer, in combination with said audio mixer, wherein said audio mixer comprises a plurality of input channels and at least one output channel associated with said input channels, a plurality of controls, and means for mixing a plurality of audio signals transmitted through said plurality of input channels in said at least one output channel, wherein said controls control of the value of at least one parameter of signals transmitted from at least one input channel to said at least one output channel, wherein said apparatus comprises:

(a) means for producing a first test signal defined by at least one parameter;

(b) means for transmitting said first test signal through said at least one input channel during a first period of time;

(c) means for recording said at least one parameter of said first test signal at said at least one output channel during said first period of time; wherein said producing means and said transmitting means comprise a spectrum analyzer sweep oscillator for producing a first test signal defined by a plurality of amplitudes at a plurality of frequencies.

41. The apparatus defined by claim 38 further comprising:

(d) means for producing a second test signal defined by at least one parameter, wherein said at least one parameter of said second test signal is substantially identical to said at least one parameter of said first test signal;

(e) means for transmitting said second test signal through said at least one input during a second time period later than said first time period; and (f) means for displaying said recorded at least one parameter of said first test signal and means for displaying said at least one parameter of said second test signal at said at least one output.

42. The apparatus defined by claim 41 wherein said means for producing and transmitting said first and second test signals comprises an oscillator, wherein said recording means comprises a personal computer, wherein said means for displaying said first and second test signals comprises a cathode ray tube.

43. The apparatus defined by claim 41 wherein said means for displaying said first and second test signals comprises a digital audio level meter.

44. The apparatus defined by claim 41 wherein said means for displaying said first and second test signals comprises an analog audio level meter.

45. An apparatus for assisting a user of an audio mixer in reestablishing previously established settings on the controls of said audio mixer, in combination with said audio mixer, wherein said audio mixer comprises a plurality of input channels, a plurality of controls, at least one output channel associated with said input channels, and means for mixing a plurality of audio signals transmitted through said plurality of input channels in said at least one output channel, wherein said controls control the value of at least one parameter of signals transmitted from at least one input channel to said at least one output channel, wherein said apparatus comprises:

(a) means for producing a first test signal defined by at least one parameter;
(b) means for transmitting said first test signal through said at least one input channel during a first time period;
(c) means for recording said at least one parameter of said first test signal at said at least one output channel during said first time period;
(d) means for producing a second test signal defined by at least one parameter, wherein said at least one parameter of said second test signal is substantially identical to said at least one parameter of said first test signal;
(e) means for transmitting said second test signal through said at least one input channel during a second time period later than said first time period; and
(f) means for displaying said recorded at least one parameter of said first test signal and means for displaying said at least one parameter of said second test signal at said at least one output; wherein said means for producing and transmitting said first and second test signals comprises a spectrum analyzer sweep oscillator.

46. The apparatus defined by claim 41 further comprising:

(g) means for measuring said at least one parameter of said first and second test signals at said at least one output.

47. The apparatus defined by claim 46 wherein said measuring means comprises a digital AC voltmeter.

48. The apparatus defined by claim 46 wherein said measuring means comprises a digital DC voltmeter having a rectifier circuit.

49. The apparatus defined by claim 46 wherein said measuring means comprises an analog to digital converter including a rectifier circuit and means to measure said DC signals produced by the conversion of said analog signal to a digital signal.

50. An apparatus for assisting a user of an audio mixer in reestablishing previously established settings on the controls of said audio mixer, in combination with said audio mixer, wherein said audio mixer comprises a plurality of input channels, a plurality of controls, at least one output channel associated with said input channels, and means for mixing a plurality of audio signals transmitted through said plurality of input channels in said at least one output channel, wherein said controls control the value of at least one parameter of signals transmitted from at least one input channel to said at least one output channel, wherein said apparatus comprises:

(a) means for producing a first test signal defined by at least one parameter;
(b) means for transmitting said first test signal through said at least one input channel during a first time period;
(c) means for recording said at least one parameter of said first test signal at said at least one output channel during said first time period;
(d) means for producing a second test signal defined by at least one parameter, wherein said at least one parameter of said second test signal is substantially identical to said at least one parameter of said first test signal;
(e) means for transmitting said second test signal through said at least one input channel during a second time period later than said first time period;
(f) means for displaying said recorded at least one parameter of said first test signal and means for displaying said at least one parameter of said second test signal at said at least one output; and
(g) means for measuring said at least one parameter of said first and second test signals at said at least one output, wherein said measuring means comprises a multi-channel scanner having a rectifier circuit.

51. An apparatus for assisting a user of an audio mixer in reestablishing previously established settings on the controls of said audio mixer, in combination with said audio mixer, wherein said audio mixer comprises a plurality of input channels, a plurality of controls, at least one output channel associated with said input channels, and means for mixing a plurality of audio signals transmitted through said plurality of input channels in said at least one output channel, wherein said controls control the value of at least one parameter of signals transmitted from at least one input channel to said at least one output channel, wherein said apparatus comprises:

(a) means for producing a first test signal defined by at least one parameter;
(b) means for transmitting said first test signal through said at least one input channel during a first time period;
(c) means for recording said at least one parameter of said first test signal at said at least one output channel during said first time period;
(d) means for producing a second test signal defined by at least one parameter, wherein said at least one parameter of said second test signal is substantially identical to said at least one parameter of said first test signal;
(e) means for transmitting said second test signal through said at least one input channel during a second time period later than said first time period;
(f) means for displaying said recorded at least one parameter of said first test signal and means for displaying said at least one parameter of said second test signal at said at least one output; and
(g) means for measuring said at least one parameter of said first and second test signals at said at least one output, wherein said measuring means comprises a spectrum analyzer including a sweep oscillator in the audio range.

52. An apparatus for assisting a user of an audio mixer in reestablishing previously established settings on the controls of said audio mixer, in combination with said audio mixer, wherein said audio mixer comprises a plurality of input channels, a plurality of controls, at least one output channel associated with said input channels, and means for mixing a plurality of audio signals transmitted through said plurality of input channels in said at least one output channel, wherein said controls control the value of at least one parameter of signals transmitted from at least one input channel to said at least one output channel, wherein said apparatus comprises:

(a) means for producing a first test signal defined by at least one parameter;
(b) means for transmitting said first test signal through said at least one input channel during a first time period;
(c) means for recording said at least one parameter of said first test signal at said at least one output channel during said first time period;
(d) means for producing a second test signal defined by at least one parameter, wherein said at least one parameter of said second test signal is substantially identical to said at least one parameter of said first test signal;
(e) means for transmitting said second test signal through said at least one input channel during a second time period later than said first time period;
(f) means for displaying said recorded at least one parameter of said first test signal and means for displaying said at least one parameter of said second test signal at said at least one output; and
(g) means for measuring said at least one parameter of said first and second test signals at said at least one output, wherein said measuring means comprises a fast fourier transform signal analyzer in the audio range.

53. An apparatus for assisting a user of an audio mixer in reestablishing previously established settings on the controls of said audio mixer, in combination with said audio mixer, wherein said audio mixer comprises a plurality of input channels, a plurality of controls, at least one output channel associated with said input channels, and means for mixing a plurality of audio signals transmitted through said plurality of input channels in said at least one output channel, wherein said controls control the value of at least one parameter of signals transmitted from at least one input channel to said at least one output channel, wherein said apparatus comprises:

(a) means for producing a first test signal defined by at least one parameter;
(b) means for transmitting said first test signal through said at least one input channel during a first time period;
(c) means for recording said at least one parameter of said first test signal at said at least one output channel during said first time period;
(d) means for producing a second test signal defined by at least one parameter, wherein said at least one parameter of said second test signal is substantially identical to said at least one parameter of said first test signal;
(e) means for transmitting said second test signal through said at least one input channel during a second time period later than said first time period;
(f) means for displaying said recorded at least one parameter of said first test signal and means for displaying said at least one parameter of said second test signal at said at least one output; and
(g) means for measuring said at least one parameter of said first and second test signals at said at least one output, wherein said measuring means comprises a dual fourier transform signal analyzer in the audio range.

54. An apparatus for assiting a user of an audio mixer in reestablishing previously established settings on the controls of said audio mixer, in combination with said audio mixer, wherein said audio mixer comprises a plurality of input channels, a plurality of controls, at least one output channel associated with said input channels, and means for mixing a plurality of audio signals transmitted through said plurality of input channels in said at least one output channel, wherein said controls control the value of at least one parameter of signals transmitted from at least one input channel to said at least one output channel, wherein said apparatus comprises:

(a) means for producing a first test signal defined by at least one parameter;
(b) means for transmitting said first test signal through said at least one input channel during a first time period;
(c) means for recording said at least one parameter of said first test signal at said at least one output channel during said first time period;
(d) means for producing a second test signal defined by at least one parameter, wherein said at least one parameter of said second test signal is substantially identical to said at least one parameter of said first test signal;
(e) means for transmitting said second test signal through said at least one input channel during a second time period later than said first time period; and
(f) means for displaying said recorded at least one parameter of said first test signal and means for displaying said at least one parameter of said second test signal at said at least one output; and
(g) means for measuring said at least one parameter of said first and second test signals at said at least one output, wherein said measuring means comprises a network analyzer in the audio range.

55. The apparatus defined by claim 41 further comprising:

(h) means for comparing said at least one parameter of said recorded first test signal with said at least one parameter of said second test signal at said at least one output.

56. The apparatus defined by claim 40 wherein said comparing means comprises a personal computer.

57. The apparatus defined by claim 41 further comprising means for measuring and recording said first and second test signals before said first and second test signals are transmitted to said at least one input, and means for altering said second test signal so that said second test signal is substantially identical to said first test signal.

58. An apparatus for assisting a user of an audio mixer in reestablishing previously established settings on the controls of said audio mixer, in combination with said audio mixer, wherein said audio mixer comprises a plurality of input channels, a plurality of controls, at least one output channel associated with said input channels, and means for mixing a plurality of audio signals transmitted through said plurality of input channels in said at least one output channel, wherein said controls control the value of at least one parameter of signals transmitted from at least one input channel to said at least one output channel, wherein said apparatus comprises:

(a) means for producing a first test signal defined by at least one parameter;
(b) means for transmitting said first test signal through said at least one input channel during a first time period;
(c) means for recording said at least one parameter of said first test signal at said at least one output channel during said first time period, wherein said producing and transmitting means comprises means for producing and transmitting a first test signal defined by a plurality of parameters, wherein said plurality of parameters are controlled by said controls of said audio mixer, and wherein said recording means comprises means for recording said plurality of parameters of said first test signal at said at least one output.

59. An apparatus for assisting a user of an audio mixer in reestablishing previously established settings on the controls of said audio mixer, in combination with said audio mixer, wherein said audio mixer comprises a plurality of input channels, a plurality of controls, at least one output channel associated with said input channels, and means for mixing a plurality of audio signals transmitted through said plurality of input channels in said at least one output channel, wherein said controls control the value of at least one parameter of signals transmitted from at least one input channel to said at least one output channel, wherein said apparatus comprises:

(a) means for producing a first test signal defined by at least one parameter;

(b) means for transmitting said first test signal through said at least one input channel during a first time period;

(c) means for recording said at least one parameter of said first test signal at said at least one output channel during said first time period;

(d) means for producing a second test signal defined by at least one parameter, wherein said at least one parameter of said second test signal is substantially identical to said at least one parameter of said first test signal;

(e) means for transmitting said second test signal through said at least one input channel during a second time period later than said first time period; and (f) means for displaying said recorded at least one parameter of said first test signal and means for displaying said at least one parameter of said second test signal at said at least one output; and wherein said means for producing and transmitting said first and second test signals comprise means for producing and transmitting first and second test signals defined by a plurality of parameters wherein said plurality of parameters are controlled by said controls of said audio mixer, wherein said recording means comprises means for recording said plurality of parameters of said first test signal, and wherein said display means comprises means for displaying said plurality of parameters of said first and second test signals.

60. The apparatus defined by claim 59 wherein said plurality of parameters comprises at least first and second parameters, wherein said controls of said audio mixer comprises means for controlling the value of said first parameter and means for controlling the value of said second parameter, wherein said first and second parameter control means each comprise an input and an output, wherein said first parameter control means is positioned between said at least one input channel and said second parameter control means so that said signals from said input channel are transmitted to said input of said first parameter control means and said output of said first parameter control means is transmitted to said input of said second parameter control means, and wherein said second parameter control means is positioned between said first parameter control means and said output channel so that said output of said second parameter control means is transmitted to said output channel, wherein said means for transmitting said first and second test signals comprises means for transmitting said first and second test signals to said input channel and directly to said input of said second parameter control means, wherein said recording means comprises means for recording said first test signal at said output of said first parameter control means and at said output of said second parameter control means, wherein said display means comprise means for displaying said first and second test signals when said first and second test signals are at said output of said first parameter control means and at said output of said second parameter control means.

61. The apparatus defined by claim 60 wherein said first parameter comprises the amplitude of first and second test signals and wherein said second parameter comprises the frequency of said first and second test signals, wherein said recording means comprises means for recording the amplitude of said first test signal at a plurality of frequencies, and wherein said display means comprises means for displaying said the amplitude of said first and second test signals at a plurality of frequencies.

62. The apparatus defined by claim 41 wherein said audio mixer comprises a plurality of input channels for receiving and processing audio signals, wherein said transmitting means comprises means for transmitting said first and second test signals through each of said plurality of input channels, wherein said recording means comprises means for recording said first test signal transmitted to each of said plurality of input channels at said least one output, and wherein said display means comprises means for displaying said first and second test signals transmitted through each of said plurality of input channels.

63. The apparatus defined by claim 41 wherein at least one input channel comprising a plurality of output channels, wherein said recording means comprises means for recording said first test signal at each of said plurality of output channels, and wherein said display means comprises means for displaying said first and second test signals as said first and second test signals are transmitted out of each of said plurality of output channels.

64. The method defined by claim 1 wherein said circuit comprises a mixing fader, wherein said input and said output comprise the input and output of said mixing fader, wherein said method further comprises transmitting said first test signal through said input into said mixing fader and recording said first test signal at the output of said mixing fader.

65. The method defined by claim 64 wherein said circuit further comprises an equalizer comprising an input and an output, wherein said method further comprises transmitting said first test signal through said input of said equalizer into said equalizer and recording said first test signal at said output of said equalizer.

66. The method defined by claim 1 wherein said audio mixer further comprises at least one input channel comprising said input and said circuit and at least one output channel associated with said at least one input channel and through which said processed audio signals are outputted, wherein said at least one input channel receives audio signals and processes said audio signals in said circuit, wherein said method further comprises the steps of transmitting a first test signal through said input channel, and recording said first test signal at said output of said circuit during said first period of time.

67. The method defined by claim 66 wherein said at least one output channel outputs said processed audio signals from said audio mixer to the outside of said audio mixer, wherein said at least one input channel receives audio signals originating from outside said audio mixer, wherein said method further comprises the steps of transmitting a first test signal from outside said audio mixer through the entire said at least one input channel and recording said first test signal at said at least one output channel.

68. The apparatus defined by claim 38 wherein said circuit comprises a mixing fader having an input and an output wherein said transmitting means transmits said first test signal through said input and said mixing fader, wherein said recording means records said first test signal at said output of said mixing fader.

69. The apparatus defined by claim 68 wherein said circuit further comprises an equalizer having an input and an output, wherein said transmitting means transmits said first test signal through said input of said equalizer and through said equalizer, wherein said recording means records said first test signal at said output of said equalizer.

70. The apparatus defined by claim 38 wherein said audio mixer further comprises at least one input channel comprising said input and said circuit, wherein said audio mixer further comprises at least one output channel associated with said at least one input channel, wherein said at least one input channel receives audio signals from outside said audio mixer and processes said audio signals, wherein said at least one output channel outputs said audio signals processed by the entire at least are input channel, wherein said transmitting means transmits said first test signal through said at least one input channel, wherein said recording means records said first test signal at said at least one output channel.

* * * * *